US012718218B2

(12) United States Patent
Takemura et al.

(10) Patent No.: US 12,718,218 B2
(45) **Date of Patent: *Aug. 25, 2026**

(54) TRANSACTION SYSTEM, TRANSACTION APPARATUS, AND TRANSACTION METHOD

(71) Applicant: Glory Ltd., Himeji (JP)

(72) Inventors: Junichi Takemura, Himeji (JP); Minoru Higashiyama, Himeji (JP); Toyofumi Iwami, Himeji (JP); Toshimitsu Yoshinari, Himeji (JP); Kensaku Sagano, Himeji (JP); Hiromichi Okizuka, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/004,469

(22) Filed: Dec. 30, 2024

(65) Prior Publication Data

US 2025/0139601 A1 May 1, 2025

Related U.S. Application Data

(63) Continuation of application No. 17/329,165, filed on May 25, 2021, now Pat. No. 12,229,742, which is a (Continued)

(30) Foreign Application Priority Data

Nov. 26, 2018 (JP) ................................ 2018-220718

(51) Int. Cl.
*G06Q 30/00* (2023.01)
*G06Q 20/08* (2012.01)
(Continued)

(52) U.S. Cl.
CPC ......... *G06Q 20/203* (2013.01); *G06Q 20/085* (2013.01); *G06Q 20/1085* (2013.01);
(Continued)

(58) Field of Classification Search
CPC ............... G06Q 20/203; G06Q 20/085; G06Q 20/1085; G06Q 20/3223; G06Q 20/381;
(Continued)

(56) References Cited

U.S. PATENT DOCUMENTS 5,963,647 A 10/1999 Downing et al.
5,987,439 A 11/1999 Gustin et al.
(Continued)

FOREIGN PATENT DOCUMENTS

CA 2794518 A1 9/2011
EP 3399505 A1 11/2018
(Continued)

OTHER PUBLICATIONS

International Search Report and Written Opinion mailed on Feb. 18, 2020, received for PCT Application PCT/JP2019/045098, Filed on Nov. 18, 2019, 8 pages.

(Continued)

*Primary Examiner* — Meredith A Long
(74) *Attorney, Agent, or Firm* — XSENSUS LLP

(57) ABSTRACT

In order to adjust the amount of money in a transaction apparatus installed in a store, a transaction system includes: a money handling unit that receives money, and recognizes and counts the received money to acquire a first total amount of the received money and a quantity of money for each denomination; a memory that stores therein a transaction condition including a transaction fee rate previously set for each denomination; and a processing unit that calculates, for each denomination, an amount of money by multiplying the quantity of money for each denomination by the transaction fee rate, based on the quantity of money and the transaction condition, and performs processing on a transaction of the received money, based on the first total amount acquired by the money handling unit and on a second total amount (Continued)

calculated by summing up the calculated amounts of money for the respective denominations.

18 Claims, 17 Drawing Sheets

Related U.S. Application Data continuation of application No. PCT/JP2019/045098, filed on Nov. 18, 2019.

(51) Int. Cl.

| | |
|---|---|
| ***G06Q 20/10*** | (2012.01) |
| ***G06Q 20/20*** | (2012.01) |
| ***G06Q 20/32*** | (2012.01) |
| ***G06Q 20/38*** | (2012.01) |
| ***G06Q 20/40*** | (2012.01) |
| ***G06Q 30/0207*** | (2023.01) |
| ***G06Q 30/0238*** | (2023.01) |
| ***G06Q 40/02*** | (2023.01) |
| ***G07D 11/24*** | (2019.01) |
| ***G07F 19/00*** | (2006.01) |

(52) U.S. Cl.

CPC ....... *G06Q 20/3223* (2013.01); *G06Q 20/381* (2013.01); *G06Q 20/405* (2013.01); *G06Q 30/0215* (2013.01); *G06Q 30/0238* (2013.01); *G06Q 40/02* (2013.01); *G07D 11/24* (2019.01); *G07F 19/202* (2013.01)

(58) Field of Classification Search

CPC ............. G06Q 20/405; G06Q 30/0215; G06Q 30/0238; G06Q 40/02; G06Q 10/087; G06Q 30/06; G06Q 30/0207; G07D 11/24; G07D 11/0087; G07D 11/20; G07D 11/60; G07F 19/202; G07F 17/0035; G07F 19/20

See application file for complete search history.

(56) References Cited

U.S. PATENT DOCUMENTS

| | | | |
|---|---|---|---|
| 6,116,402 | A | 9/2000 | Beach et al. |
| 6,659,259 | B2 | 12/2003 | Knox et al. |
| 7,736,223 | B2 | 6/2010 | Pace |
| 7,971,699 | B2 | 7/2011 | Molbak et al. |
| 7,980,378 | B2 | 7/2011 | Jones et al. |
| 8,042,732 | B2 | 10/2011 | Blake et al. |
| 8,118,660 | B2 | 2/2012 | Pace |
| 8,157,162 | B2 | 4/2012 | Jönsson et al. |
| 8,443,958 | B2 | 5/2013 | Blake et al. |
| 8,657,187 | B1 | 2/2014 | Li et al. |
| 8,950,566 | B2 | 2/2015 | Hallowell et al. |
| 8,959,029 | B2 | 2/2015 | Jones et al. |
| 9,058,598 | B1 | 6/2015 | Li et al. |
| 9,117,327 | B1 | 8/2015 | Wasil et al. |
| 9,129,294 | B2 | 9/2015 | Yahn |
| 9,640,040 | B2 | 5/2017 | Irudayam et al. |
| 10,282,725 | B2 | 5/2019 | Bennett et al. |
| 10,825,004 | B1 | 11/2020 | Walker et al. |
| 12,229,742 | B2 * | 2/2025 | Takemura .............. G07D 11/20 |
| 2002/0029195 | A1 | 3/2002 | Russell et al. |
| 2002/0153415 | A1 | 10/2002 | Minami et al. |
| 2002/0179401 | A1 | 12/2002 | Knox et al. |
| 2003/0078884 | A1 | 4/2003 | Bauman |
| 2004/0267666 | A1 | 12/2004 | Minami et al. |
| 2005/0216406 | A1 | 9/2005 | Obadan |
| 2006/0157934 | A1 | 7/2006 | Yoseloff et al. |
| 2006/0219519 | A1 | 10/2006 | Molbak et al. |
| 2007/0108267 | A1 | 5/2007 | Jonsson et al. |
| 2007/0124242 | A1 | 5/2007 | Reis |
| 2007/0232384 | A1 | 10/2007 | Pace |
| 2007/0232385 | A1 | 10/2007 | Pace |
| 2010/0082443 | A1 | 4/2010 | Folk et al. |
| 2011/0155799 | A1 | 6/2011 | Meszaros et al. |
| 2011/0238549 | A1 | 9/2011 | Poon |
| 2014/0046842 | A1 | 2/2014 | Irudayam et al. |
| 2015/0087408 | A1 | 3/2015 | Siemasko et al. |
| 2016/0012465 | A1 | 1/2016 | Sharp |
| 2017/0249629 | A1 | 8/2017 | Bennett et al. |
| 2018/0101898 | A1 | 4/2018 | Poon |
| 2018/0218555 | A1 | 8/2018 | Nguyen |
| 2020/0175814 | A1 | 6/2020 | Siemasko et al. |
| 2021/0279704 | A1 * | 9/2021 | Matsuhashi .......... G06Q 20/202 |

FOREIGN PATENT DOCUMENTS

| | | | |
|---|---|---|---|
| JP | 2006-178512 | A | 7/2006 |
| JP | 2010-237933 | A | 10/2010 |
| JP | 5640735 | B2 | 12/2014 |
| WO | 02/099561 | A2 | 12/2002 |
| WO | 03/071386 | A2 | 8/2003 |
| WO | 2004/034196 | A2 | 4/2004 |
| WO | 2011/082125 | A2 | 7/2011 |
| WO | 2011/119924 | A1 | 9/2011 |
| WO | 2014/134485 | A1 | 9/2014 |
| WO | 2016/098219 | A | 6/2016 |
| WO | 2016/203875 | A1 | 12/2016 |

OTHER PUBLICATIONS

Extended European Search Report issued Nov. 23, 2021, in corresponding European Patent Application No. 19889902.3.

University of Utah. "Best Practices for Cash Control." (Aug. 24, 2012). Retrieved online May 10, 2023. https://fbs.admin.utah.edu/download/income/CashControlandDepositProcedures.pdf (Year: 2012).

FATF Report. "Money Laundering Through the Physical Transportation of Cash." (Oct. 2015). Retrieved online May 10, 2023. https://www.fatf-gafi.org/contenUdam/fatf-gafi/reports/money-laundering-through-transportation-cash.pdf (Year: 2015).

Peter Sands et al. "Making it Harder for the Bad Guys: The Case for Eliminating High Denomination Notes." (Feb. 2016). Retrieved online May 10, 2023. https://www.hks.harvard.edu/sites/defaulUfiles/centers/mrcbg/files/Eliminating%2BHDNfinalXYZ. pdf (Year: 2016).

* cited by examiner

| STORE | APPARATUS | TRANSACTION | TRANSACTION PARTNER | TRANSACTION CONDITION | | | | |
|---|---|---|---|---|---|---|---|---|
| | | | | DENOMINATION | INCENTIVE RATE | COMMISSION RATE | TRANSACTION FEE RATE | UPDATE DATE/ TIME |
| S001 | M001 | MONEY CHANGE | GENERAL CUSTOMER | € 0.01 | 2.00% | 7.00% | -5.00% | 20181020 20:06 |
| | | | | € 0.02 | 9.00% | 7.00% | +2.00% | 20181021 12:09 |
| | | | | ⋮ | | | | |
| | | | MEMBER CUSTOMER | | | | | |
| | | | MEMBER STORE | | | | | |
| | | | ⋮ | | | | | |
| | | STORE POINT | | | | | | |
| | | POINT EXCHANGE (X COMPANY) | | | | | | |
| | | DONATION (SUPPORT TO AFFECTED AREAS) | | | | | | |
| | | ⋮ | | | | | | |
| | M002 | | | | | | | |
| | ⋮ | | | | | | | |
| S002 | | | | | | | | |
| ⋮ | | | | | | | | |

PLEASE SELECT EXCHANGE OBJECT
MONEY
POINT
COUPON OF X COMPANY (POINT EXCHANGE)
CANCEL

COIN → POINT
DENOMI-NATION
TRANSACTION FEE RATE
2
-1.00% (COMMISSION 1.00%)
1
-2.50% (COMMISSION 2.50%)
0.5
+1.00%
GIFT POINT
0.2
+0.00%
0.1
+0.00%
0.05
+0.00%
0.02
+0.00%
0.01
+0.00%
COMMISSION-FREE
SPECIAL OFFER!
RETURN
CANCEL
TRANSACTION START

COIN → POINT

PLEASE INSERT COINS

| DENOMI-NATION | INSERTED COINS | | COMMISSION·REWARD | |
|---|---|---|---|---|
| 2€ | 1 | 2.0€ | -1% | -0.1€ |
| 1€ | 20 | 20.0€ | -2.5% | -0.5€ |
| 0.5€ | 80 | 40.0€ | +1% | +0.4€ |
| 0.2€ | 12 | 2.4€ | 0% | 0€ |
| 0.1€ | 45 | 4.5€ | 0% | 0€ |
| 0.05€ | 110 | 5.5€ | 0% | 0€ |
| 0.02€ | 50 | 1.0€ | 0% | 0€ |
| 0.01€ | 0 | 0€ | 0% | 0€ |
| TOTAL | 278 | 100.4€ | | -0.2€ (COMMISSION 0.2€) |

DEPOSIT AMOUNT 100.2€

COIN CHANGE | CANCEL | NEXT

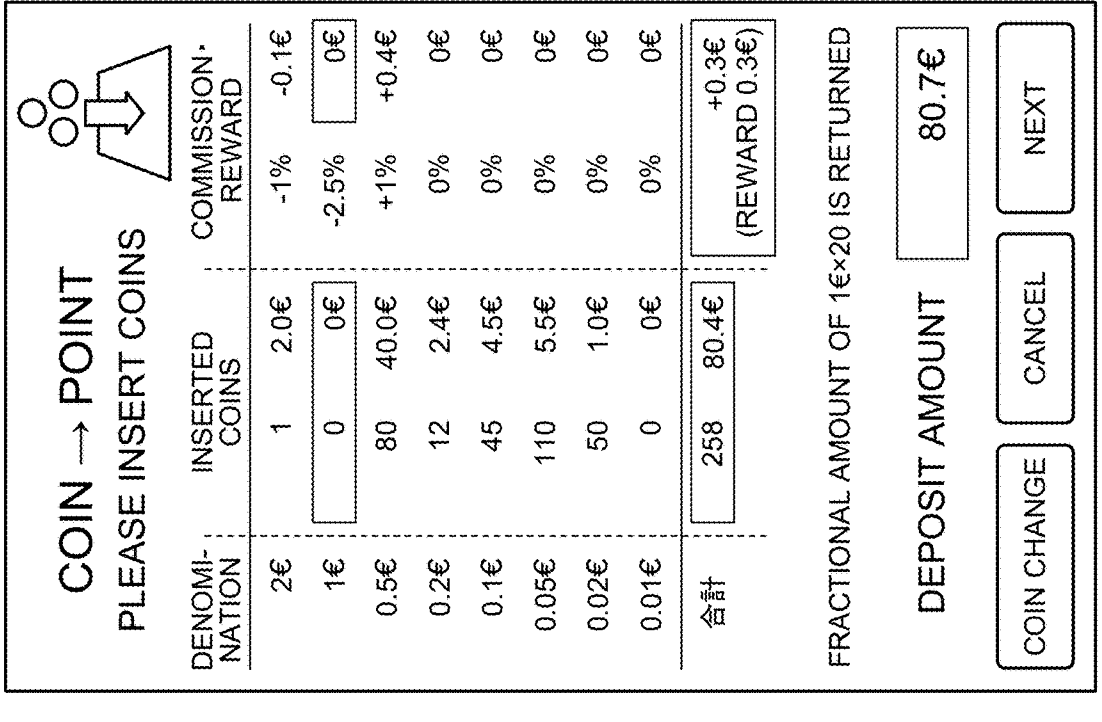
FIG.10B
COIN → POINT
PLEASE INSERT COINS
DENOMI-NATION
INSERTED COINS
COMMISSION·REWARD
2€ 1 2.0€ -1% -0.1€
1€ 0 0€ -2.5% 0€
0.5€ 80 40.0€ +1% +0.4€
0.2€ 12 2.4€ 0% 0€
0.1€ 45 4.5€ 0% 0€
0.05€ 110 5.5€ 0% 0€
0.02€ 50 1.0€ 0% 0€
0.01€ 0 0€ 0% 0€
合計 258 80.4€ +0.3€ (REWARD 0.3€)
FRACTIONAL AMOUNT OF 1€×20 IS RETURNED
DEPOSIT AMOUNT
80.7€
COIN CHANGE
CANCEL
NEXT

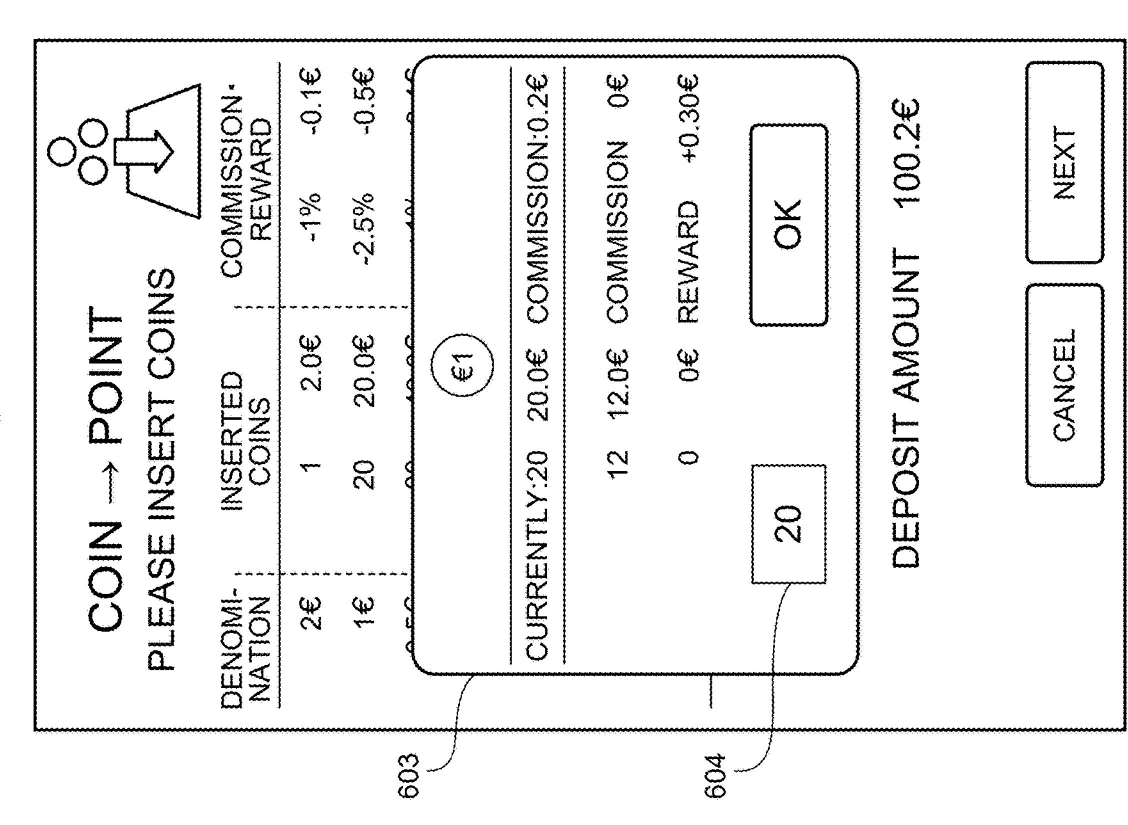
FIG.10A
COIN → POINT
PLEASE INSERT COINS
DENOMI-NATION
INSERTED COINS
COMMISSION·REWARD
2€ 1 2.0€ -1% -0.1€
1€ 20 20.0€ -2.5% -0.5€
€1
CURRENTLY:20 20.0€ COMMISSION:0.2€
12 12.0€ COMMISSION 0€
0 0€ REWARD +0.30€
20
OK
DEPOSIT AMOUNT 100.2€
CANCEL
NEXT
603
604

FIG.12A

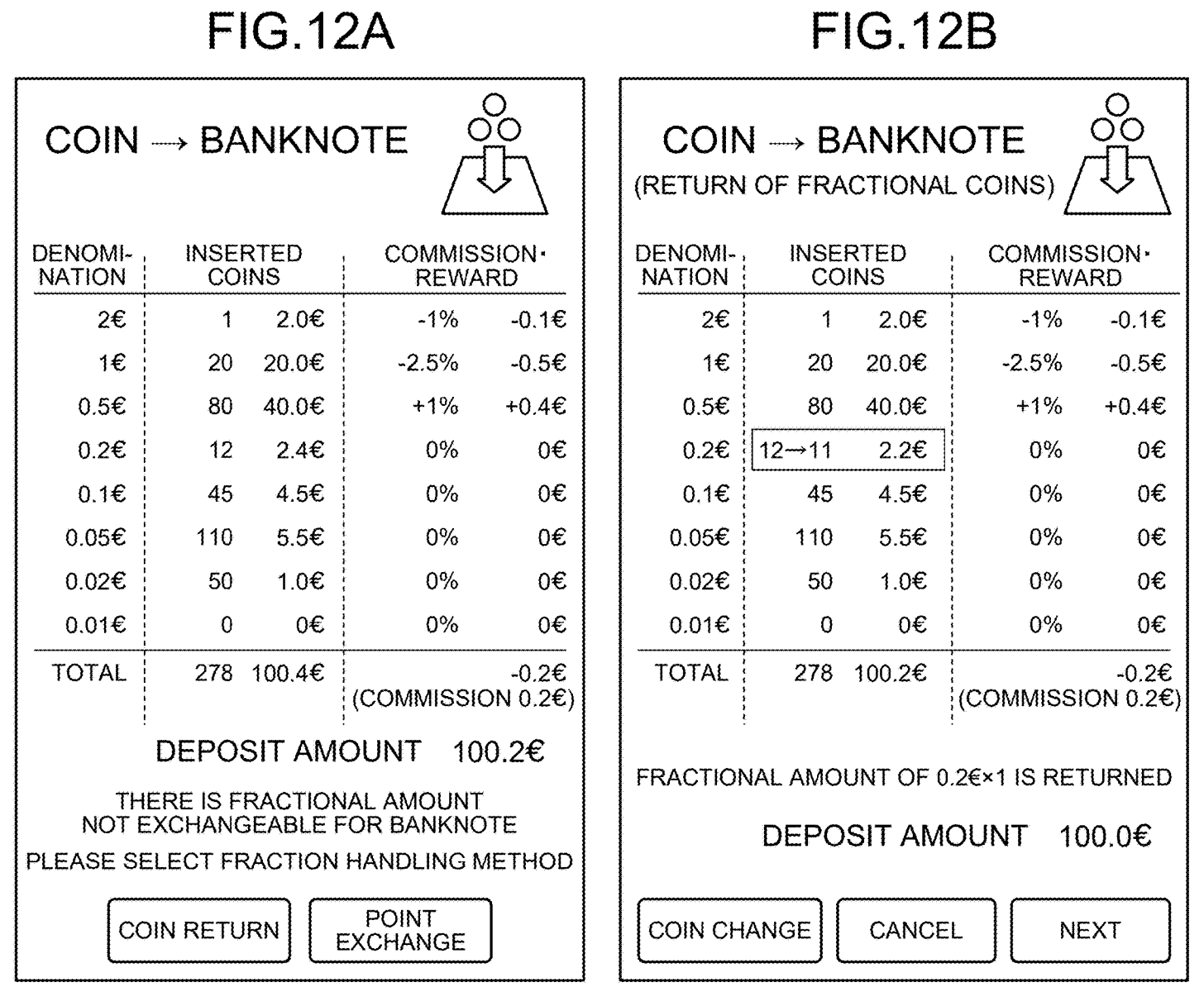

COIN → BANKNOTE

| DENOMINATION | INSERTED COINS | | COMMISSION·REWARD | |
|---|---|---|---|---|
| 2€ | 1 | 2.0€ | -1% | -0.1€ |
| 1€ | 20 | 20.0€ | -2.5% | -0.5€ |
| 0.5€ | 80 | 40.0€ | +1% | +0.4€ |
| 0.2€ | 12 | 2.4€ | 0% | 0€ |
| 0.1€ | 45 | 4.5€ | 0% | 0€ |
| 0.05€ | 110 | 5.5€ | 0% | 0€ |
| 0.02€ | 50 | 1.0€ | 0% | 0€ |
| 0.01€ | 0 | 0€ | 0% | 0€ |
| TOTAL | 278 | 100.4€ | | -0.2€ (COMMISSION 0.2€) |

DEPOSIT AMOUNT 100.2€

THERE IS FRACTIONAL AMOUNT NOT EXCHANGEABLE FOR BANKNOTE

PLEASE SELECT FRACTION HANDLING METHOD

COIN RETURN | POINT EXCHANGE

FIG.12B

COIN → BANKNOTE (RETURN OF FRACTIONAL COINS)

| DENOMINATION | INSERTED COINS | | COMMISSION·REWARD | |
|---|---|---|---|---|
| 2€ | 1 | 2.0€ | -1% | -0.1€ |
| 1€ | 20 | 20.0€ | -2.5% | -0.5€ |
| 0.5€ | 80 | 40.0€ | +1% | +0.4€ |
| 0.2€ | 12→11 | 2.2€ | 0% | 0€ |
| 0.1€ | 45 | 4.5€ | 0% | 0€ |
| 0.05€ | 110 | 5.5€ | 0% | 0€ |
| 0.02€ | 50 | 1.0€ | 0% | 0€ |
| 0.01€ | 0 | 0€ | 0% | 0€ |
| TOTAL | 278 | 100.2€ | | -0.2€ (COMMISSION 0.2€) |

FRACTIONAL AMOUNT OF 0.2€×1 IS RETURNED

DEPOSIT AMOUNT 100.0€

COIN CHANGE | CANCEL | NEXT

FIG.14

| STORE | APPARATUS | TRANSACTION | TRANSACTION PARTNER | TRANSACTION CONDITION | | | | |
|---|---|---|---|---|---|---|---|---|
| | | | | DENOMINATION | INCENTIVE RATE | COMMISSION RATE | TRANSACTION FEE RATE | UPDATE DATE/TIME |
| S002 | M010 | WITHDRAWAL OF CHANGE | S002 | € 0.01 | 0% | 0% | 0% | 20181018 11:02 |
| | | | | € 0.02 | 0% | 0% | 0% | 20181018 11:02 |
| | | | | ⋮ | | | | |
| | | | S003 | € 0.01 | 0% | 5.00% | -5.00% | 20181020 13:10 |
| | | | | € 0.02 | 2.00% | 0% | +2.00% | 20181020 13:10 |
| | | | | ⋮ | | | | |
| | | | ⋮ | | | | | |
| S010 | | | | | | | | |
| ⋮ | | | | | | | | |

TRANSACTION SYSTEM, TRANSACTION APPARATUS, AND TRANSACTION METHOD

CROSS-REFERENCE TO RELATED APPLICATIONS

The present application is a continuation of U.S. application Ser. No. 17/329,165, filed May 25, 2021, which is a continuation of, and claims priority to, International application PCT/JP2019/045098, filed Nov. 18, 2019, which claims priority to JP 2018-220718, filed Nov. 26, 2018 the entire contents of each being incorporated herein by reference.

TECHNICAL FIELD

The present disclosure relates to a transaction system, a transaction apparatus, and a transaction method for transaction of money.

BACKGROUND ART

Conventionally, if shortage or surplus of money occurs in a store, a person in charge of the store requests a cash-in-transit (CIT) company for conveyance of money. For example, if shortage of money to be used as change occurs at a checkout counter in the store, the person in charge requests the CIT company to deliver money to the store. If surplus of money in the store occurs, the person in charge requests the CIT company to collect money from the store. Since these requests to the CIT company incur service fees, it is desired that the store can control the quantity of money in the store without using the service by CIT company.

Japanese Patent No. 5640735 discloses a system in which, in order to accumulate money in a money handling apparatus installed in a store, customers are requested to deposit money into the money handling apparatus. In this system, if shortage of money in the money handling apparatus occurs, a notification that encourages customers to deposit money into the money handling apparatus is transmitted to mobile phones of the customers. Customers having received the notification deposit money into the money handling apparatus, whereby money is accumulated in the money handling apparatus in the store.

SUMMARY

In the conventional art, however, there are cases where the system cannot deal with shortage of money in the store. Specifically, there are cases where money cannot be accumulated as expected by the store. For example, if the denomination of money deposited by the customer into the apparatus is different from the denomination of money that is insufficient in the store, shortage of money is not resolved. Besides, it is not preferable that deposit of money is continued exceeding the shortage amount of money.

The present disclosure is made in view of the problem of the conventional art, and an object of the present disclosure is to provide a transaction system, a transaction apparatus, and a transaction method capable of adjusting the quantity of money stored in the transaction apparatus installed in a store.

The present disclosure is made in view of the problems of the conventional art. The present disclosure addresses issues, as discussed herein, with a transaction system including: a money handling unit configured to receive money, and recognize and count the received money to acquire a quantity of money for each denomination and a first total amount of the received money; a memory configured to store therein a transaction condition including a transaction fee rate set for each denomination in advance; and a processing unit configured to calculate, for each denomination, an amount of money by multiplying the quantity of money for each denomination by the transaction fee rate, based on the quantity of money and the transaction condition, and to perform processing related to a transaction of the received money, based on the first total amount acquired by the money handling unit and on a second total amount that is calculated by summing up the calculated amounts of money for the respective denominations.

BRIEF DESCRIPTION OF THE DRAWINGS

FIG. 1 is a schematic diagram showing a configuration of a transaction system.

FIG. 3 shows an example of transaction condition information in which transaction conditions for deposit transactions are set.

FIGS. 10A and 10B show examples of a screen of a window for changing the number of coins.

FIGS. 12A and 12B show examples of a screen displayed when a deposit amount contains a fractional amount.

FIG. 14 shows an example of transaction conditions for the change fund withdrawal transaction.

DETAILED DESCRIPTION

Figure 2:
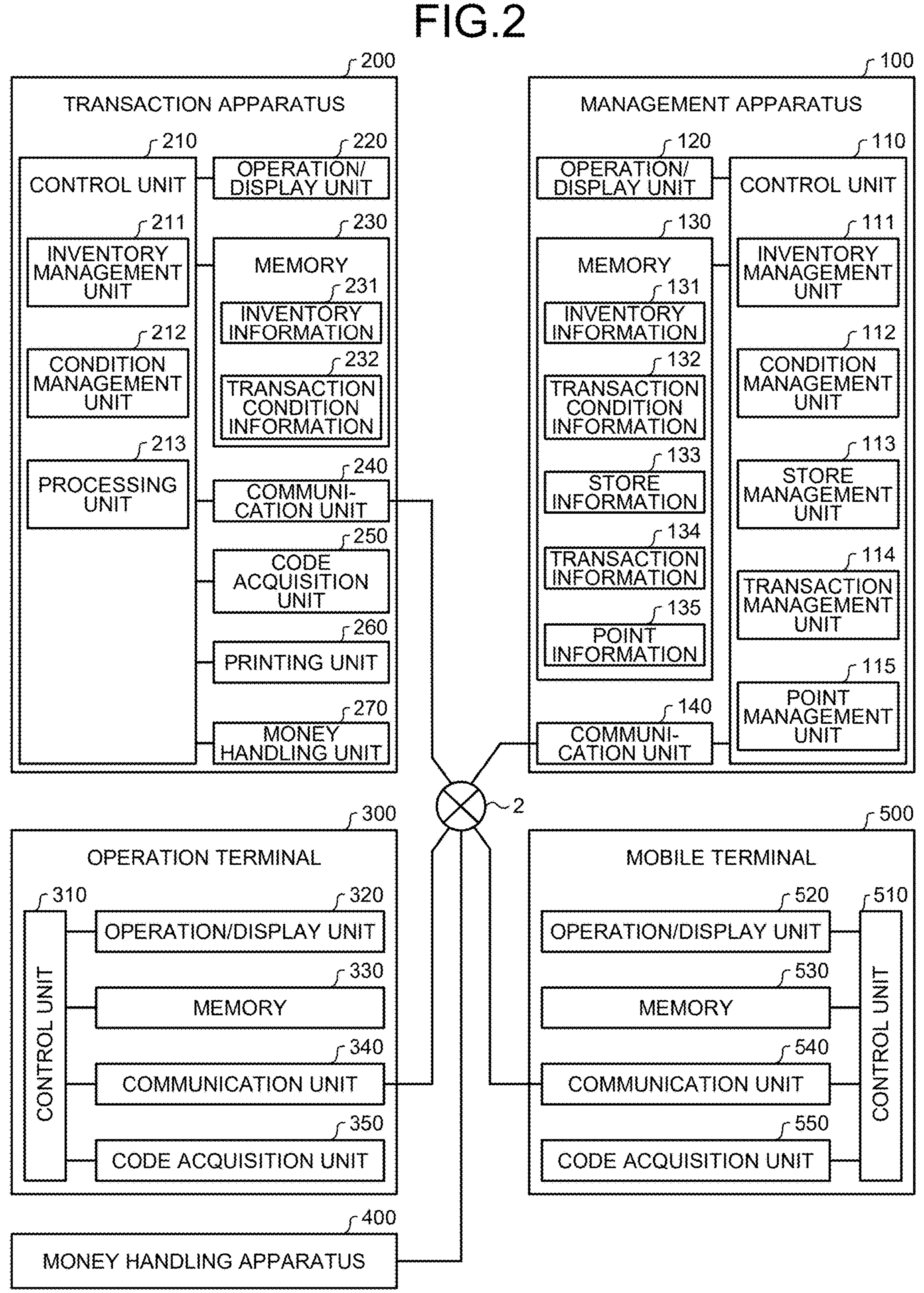
FIG. 2 is a block diagram showing schematic configurations of apparatuses constituting the transaction system.

Hereinafter, a transaction system, a transaction apparatus, and a transaction method according to the present disclosure will be described with reference to the accompanying drawings. First, an outline of transaction performed in the transaction system of the present disclosure will be described. The transaction includes deposit transaction and withdrawal transaction. The deposit transaction is a transaction in which money is deposited in a transaction apparatus, and exchanged for money of a denomination different from that of the deposited money or for points having a monetary value. The withdrawal transaction is a transaction in which withdrawal points purchased in advance are exchanged for money, and the money is withdrawn from the transaction apparatus. When the description "money" is used in this embodiment, it may include a case of only banknotes, only coins, or both banknotes and coins.

The deposit transaction includes money change and point trade. The money change is a transaction in which the money deposited in the transaction apparatus is exchanged for money of a denomination different from that of the deposited money. The point trade is a transaction in which the money deposited in the transaction apparatus is exchanged for points usable for purchasing an item, or for a coupon for acquiring the points. For example, a point is electronic data to be converted into a monetary value. For example, a coupon is electronic data including a code for acquiring a point. A user who has acquired a coupon by using the transaction system can acquire points by using the code of the coupon. The user can convert the points into the monetary value corresponding to the number of points, and use the monetary value for purchasing an item.

The transaction system manages a transaction fee rate for each denomination of money, as a transaction condition for the deposit transaction. The transaction fee rate is determined based on an incentive rate and a commission rate for each denomination. The incentive rate is a rate for calculating an amount of money to be given to a transaction partner in the transaction. An amount calculated by multiplying the incentive rate by the amount of money deposited by the user (transaction partner) is the amount of money to be given to the transaction partner. Different incentive rates may be set for different denominations, or the same incentive rate may be set for all the denominations. Alternatively, a fixed incentive rate may be set for one transaction regardless of denominations. If the incentive rate of a certain denomination is set to be high, probability that the user would deposit money of this denomination is increased. The commission rate is a rate for calculating an amount of money to be charged to the transaction partner in the transaction. An amount calculated by multiplying the commission rate by the amount of money deposited by the user (transaction partner) is the amount of money to be collected from the transaction partner. Different commission rates may be set for different denominations, or the same commission rate is set for all the denominations. Alternatively, a fixed commission rate may be set for one transaction regardless of denominations. If the commission rate of a certain denomination is set to be high, probability that the user would deposit money of this denomination is lowered.

The transaction system can receive at least one of an incentive rate and a commission rate. When a person in charge of setting a transaction fee rate sets an incentive rate and a commission rate, the transaction system sets the incentive rate as a positive value and sets the commission rate as a negative value. The transaction fee rate is calculated by adding up the incentive rate and the commission rate for each denomination, and the calculated transaction fee rate is managed in the transaction system. If only one of an incentive rate and a commission rate is set, a transaction fee rate is determined with the other rate being 0 (zero). In addition, the transaction system can receive a transaction fee rate directly. The person in charge of setting can input and set, into the transaction system, a transaction fee rate determined based on an incentive rate being a positive value and a commission rate being a negative value.

The transaction fee rate for each denomination becomes either a positive value or a negative value depending on the situation. When the transaction fee rate has a positive value, an amount calculated by multiplying the amount of money of a transaction by the transaction fee rate is an amount of money to be given as a reward to the transaction partner who has deposited the money in the transaction. When the transaction fee rate has a negative value, an amount calculated by multiplying the amount of money of a transaction by the transaction fee rate is an amount of money to be collected as a commission from the transaction partner who has deposited the money in the transaction.

For example, when an incentive rate of 10-cent coin is 5%, a transaction fee rate of 10-cent coin is +5%. If a customer deposits ten 10-cent coins in the transaction apparatus for money change to a 1-euro coin, an amount of five cents corresponding to the transaction fee rate (+5%) of one euro is given to the customer as a reward. That is, the customer who has deposited ten 10-cent coins to change them to a 1-euro coin can gain a profit of 5 cents. For example, the 5 cents are given to the customer as points that can be used for purchasing an item in the store where the transaction apparatus is installed.

When a commission rate of 10-cent coin is 5%, a transaction fee rate of 10-cent coin is −5%. If the customer deposits ten 10-cent coins in the transaction apparatus for money change to a 1-euro coin, an amount of five cents corresponding to the transaction fee rate (−5%) of one euro is required as a commission. Therefore, the customer cannot perform money change to a 1-euro coin unless he/she deposits 105 cents calculated by adding the commission of 5 cents to ten 10-cent coins. An amount of money to be discharged from the transaction apparatus at this transaction can be obtained by summing up a first total amount and a second total amount. The first total amount is obtained by summing up monetary values received from the customer. The second total amount is obtained by calculating, for each denomination, an amount of money regarding an incentive or an amount of money regarding a commission, and summing up the amounts of money calculated for all the denominations. Alternatively, the amount of money to be discharged at the transaction can also be obtained by: multiplying three numbers, which are the monetary values received from the customer, the quantity thereof, and the incentive rate or the commission rate, for each denomination; and summing up the amounts of money calculated for all the denominations. The method for calculating the amount of money to be discharged from the transaction apparatus is not limited to the above processes, and other calculation method may be adopted.

If the transaction fee rate of deposit transaction for a certain denomination in the transaction system is set to a positive value, it is possible to give a profit to the transaction partner who deposits money of this denomination in the transaction apparatus. As a result, an increase in deposit transaction for this denomination is expected. Meanwhile, if the transaction fee rate of deposit transaction for this denomination is set to a negative value, a commission is charged to the transaction partner who deposits money of this denomination in the transaction apparatus. As a result, a decrease in deposit transaction for this denomination is expected. Since the transaction fee rate of deposit transaction can be set for each denomination, it is possible to adjust the denomination and the quantity of money to be deposited in the transaction apparatus.

The withdrawal transaction is a transaction of withdrawing change fund for the store from the transaction apparatus. The store purchases, in advance, withdrawal points for withdrawing money from the transaction apparatus. The store can exchange the withdrawal points for money being stored in the transaction apparatus, and withdraw the money from the transaction apparatus. For example, the store can purchase the withdrawal points through a payment using a credit card or bank transfer, without using money of the store, and can exchange the withdrawal points to money to be used as change fund in the store. The change fund is money that is prepared by the store for use as change in the store. The withdrawal points are, for example, electronic data exchangeable for money in the transaction apparatus. The withdrawal points are points to be used only for withdrawal of change fund by the store, and therefore the withdrawal points are managed separately from the points to be used for purchasing items by customers of the store.

The transaction system manages, as a transaction condition for withdrawal transaction, a transaction fee rate for each denomination of money, as in the case of deposit transaction. As in the case of deposit transaction, the transaction fee rate can be determined by setting at least one of an incentive rate and a commission rate. Alternatively, the transaction fee rate can be set directly.

For example, the person in charge of the store purchases in advance withdrawal points (1 point=1 euro) from a party having the right of possession to money in the transaction apparatus. When an incentive rate of 1-euro coin is 5%, a transaction fee rate of 1-euro coin is +5%. When the person in charge of the store withdraws 100 1-euro coins as change fund from the transaction apparatus by using the withdrawal points, 5 euros corresponding to the transaction fee rate (+5%) of 100 euros are given as a reward to the store. That is, the store that withdraws 100 1-euro coins can gain a profit of 5 euros. For example, after completion of the withdrawal transaction, the 5 euros thus gained are converted into withdrawal points and added to the withdrawal points possessed by the store. In this case, the person in charge of the store can use the added withdrawal points for the next withdrawal transaction. Alternatively, for example, the gained 5 euros are added to the withdrawal points to be used in the currently ongoing withdrawal transaction. In this case, the person in charge of the store can withdraw 100 1-euro coins equivalent to 100 withdrawal points, by using 95 withdrawal points of the store and the gained reward of 5 euro.

When a commission rate of 1-euro coin is 5%, a transaction fee rate of 1-euro coin is −5%. When the person in charge of the store withdraws 100 1-euro coins from the apparatus, a commission of 5 euros corresponding to the transaction fee rate (−5%) of 100 euros is required. Therefore, the person in charge of the store cannot withdraw 100 1-euro coins unless he/she uses 105 withdrawal points that is a total of 100 1-euro coins and the commission of 5 euros.

If the transaction fee rate of withdrawal transaction for a certain denomination in the transaction system is set to a positive value, a profit can be given to the transaction partner who withdraws money of this denomination from the transaction apparatus. As a result, an increase in withdrawal transaction for this denomination can be expected. Meanwhile, if the transaction fee rate of withdrawal transaction for this denomination is set to a negative value, a commission is charged to the transaction partner who withdraws money of this denomination from the transaction apparatus. As a result, a decrease in withdrawal transaction for this denomination can be expected. Since the transaction fee rate of withdrawal transaction can be set for each denomination, it is possible to adjust the denomination and the quantity of money to be withdrawn from the transaction apparatus.

[Outline of System]

Figure 1:
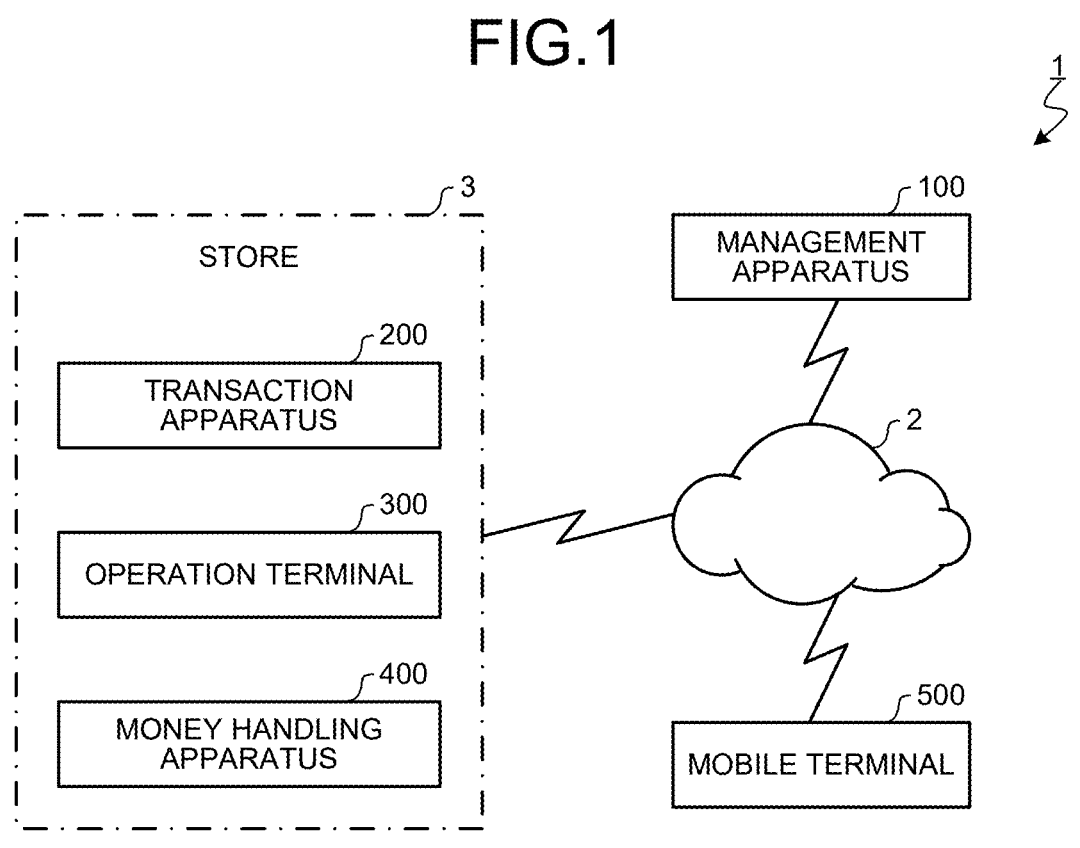

An outline of a transaction system will be described. FIG. 1 is a schematic diagram showing a configuration of a transaction system 1. The transaction system 1 includes a management apparatus 100, a transaction apparatus 200, an operation terminal 300, a money handling apparatus 400, and a mobile terminal 500. The management apparatus 100 is communicably connected to the transaction apparatus 200, the operation terminal 300, the money handling apparatus 400, and the mobile terminal 500 via a network 2. The network 2 may include the Internet. The transaction apparatus 200, the operation terminal 300, and the money handling apparatus 400 are installed in a store 3 indicated by an alternate long and short dash line. The management apparatus 100 and the mobile terminal 500 may be installed in any place as long as they are connectable to the network 2.

Although FIG. 1 shows one store 3, a plurality of stores can share the transaction system 1. For example, different stores that belong to the same company or stores that belong to different companies can share the transaction system 1. Although FIG. 1 shows one transaction apparatus 200, one operation terminal 300, and one money handling apparatus 400 installed in the store 3, the number of these apparatuses is not particularly limited. A plurality of transaction apparatuses 200, operation terminals 300, and money handling apparatuses 400 may be used in one store 3. The number of mobile terminals 500 is also not limited. Many customers may use the transaction system 1 by operating their mobile terminals 500.

Next, schematic configurations of the apparatuses constituting the transaction system 1 will be described with reference to a block diagram shown in FIG. 2.

[Management Apparatus 100]

The management apparatus 100 is implemented by computer equipment, for example. The management apparatus 100 includes a control unit 110, an operation/display unit 120, a memory 130, and a communication unit 140. The operation/display unit 120 functions as an operation unit by which various kinds of information are inputted. The operation/display unit 120 also functions as a display that outputs and displays the various kinds of information on a screen. For example, a touch panel type liquid crystal display device is used as the operation/display unit 120. The communication unit 140 communicates with external devices wirelessly or via wires. The communication unit 140 exchanges information with the external devices via the network 2.

The memory 130 is used for storage of information necessary for implementing the functions and operations of the management apparatus 100. For example, a nonvolatile memory device such as a semiconductor memory is used as the memory 130. The memory 130 stores therein inventory information 131, transaction condition information 132, store information 133, transaction information 134, and point information 135. The management apparatus 100 manages information on each of a plurality of stores by using store identification information for identifying each store. Moreover, the management apparatus 100 manages information on each of a plurality of apparatuses by using apparatus identification information for identifying each apparatus.

The inventory information 131 is used for managing the inventory of money in the store 3. The inventory of money stored in the transaction apparatus 200 and the inventory of money stored in the money handling apparatus 400 can be managed as the inventory of money in the store 3. The inventory information 131 includes: denominations of banknotes and denominations of coins stored in each apparatus in the store 3; and the number of banknotes for each denomination and the number of coins for each denomination.

The transaction condition information 132 is used for managing transaction conditions for transactions to be performed in the transaction apparatus 200. The transaction conditions include a transaction fee rate for each denomination. One of features in the transaction system 1 is that a transaction is performed based on the transaction fee rates set for each denomination, which will be described later in detail.

The store information 133 is used for managing information on the store 3. The store information 133 includes the store location of the store 3, and the installation place, where the transaction apparatus 200 is installed, in the store 3. Information on a plurality of stores is managed by using the store identification information, and information on a plurality of transaction apparatuses 200 is managed by using the apparatus identification information.

The transaction information 134 is used for managing transactions that have been performed in the transaction apparatus 200. The transaction information 134 includes the type of each transaction performed in the transaction apparatus 200, the date and time of each transaction, the denominations and the quantity for each denomination of money processed in each transaction, the transaction fee rate for each transaction, the amount of a commission or a reward in each transaction, and the number of points increased/decreased due to the transaction. The content of each transaction, which has been performed in each transaction apparatus in each store that are managed in the store information 133, is managed by using the transaction information 134.

The point information 135 is used for managing customers of the store 3 and points possessed by each customer. When purchasing an item in the store 3, the customer can use his/her points for payment for the item price. The number of points is converted into a monetary value at a predetermined conversion rate. The monetary value is used for purchasing the item as if the point is money. The point conversion rate can be changed by setting. In this embodiment, the conversion rate will be described in examples in which 1 point is converted into 1 euro.

The control unit 110 can control the respective units while using the information stored in the memory 130, based on the operations performed by using the operation/display unit 120 and on the information exchanged with the external devices. The respective units being operated under control of the control unit 110 implement the functions and operations of the management apparatus 100 according to the present embodiment.

The control unit 110 includes an inventory management unit 111, a condition management unit 112, a store management unit 113, a transaction management unit 114, and a point management unit 115. The store management unit 113 manages information on stores by using the store information 133. The inventory management unit 111 manages information on the inventory of money by using the inventory information 131. The condition management unit 112 manages information on transaction conditions by using the transaction condition information 132. The transaction management unit 114 manages information on transactions by using the transaction information 134. The point management unit 115 manages information on points by using the point information 135. Each information management performed by the control unit 110 may include registration of new information, update of registered information, and deletion of registered information.

[Transaction Apparatus 200]

The transaction apparatus 200 performs a deposit transaction and a withdrawal transaction. The transaction apparatus 200 includes a control unit 210, an operation/display unit 220, a memory 230, a communication unit 240, a code acquisition unit 250, a printing unit 260, and a money handling unit 270. Although these components corresponding to the respective functions are described for clarification, the respective functions may be implemented by a central processing unit (CPU) or a processor. Additionally, the control unit 210 may serve as the CPU, and each function may be performed by the processor. The same applies to the other apparatuses.

The operation/display unit 220 functions as an operation unit by which various kinds of information are inputted. The operation/display unit 220 also functions as a display that outputs and displays the various kinds of information on a screen. For example, a touch panel type liquid crystal display device is used as the operation/display unit 220. The communication unit 240 communicates with external devices wirelessly or via wires. The communication unit 240 exchanges information with the external devices via the network 2.

The memory 230 is used for storage of information necessary for implementing the functions and operations of the transaction apparatus 200. For example, a nonvolatile storage device such as a semiconductor memory is used as the memory 230. The memory 230 stores therein inventory information 231 and transaction condition information 232. The inventory information 231 is used for managing the inventory of money stored in the transaction apparatus 200. The inventory information 231 includes denominations of banknotes and denominations of coins stored in the transaction apparatus 200, and the number of banknotes for each denomination and the number of coins for each denomination. The transaction condition information 232 is used for managing transaction conditions for transactions to be performed in the transaction apparatus 200. The transaction condition information 232 includes a transaction condition, i.e., a transaction fee rate set for each denomination, which will be described later in detail.

The code acquisition unit 250 reads a graphic code in which information is encoded. For example, a barcode and a QR code (registered trademark) may be included in the graphic code. The transaction apparatus 200 causes the code acquisition unit 250 to read a graphic code, and encodes information embedded in the graphic code to use the information. The information can be exchanged between the transaction apparatus 200 and the external devices by using the graphic code. The code acquisition unit 250 of the transaction apparatus 200, a code acquisition unit 350 of the operation terminal 300, and a code acquisition unit 550 of the mobile terminal 500 have the same function, and these units are configured to read information of a graphic code by using a camera or a scanner.

The printing unit 260 prints information related to a transaction on a receipt. The information printed on the receipt may include the type of the transaction, the date and time of the transaction, the denomination and quantity of money processed in the transaction, the transaction fee rate for the transaction, and the amount of a commission or a reward in the transaction. If points are given to the transaction partner, the information on the receipt also includes a graphic code in which information necessary for the transaction partner to acquire the points is encoded.

The money handling unit 270 includes an inlet, a transport path, a recognition unit, storage units, and an outlet. The money handling unit 270 receives money at the inlet, takes the money one by one into the transaction apparatus 200, and transports the money along the transport path. The transport path is provided with the recognition unit. The recognition unit is used for recognizing and counting the money transported along the transport path. The recognized and counted money can be stored for each denomination in a plurality of storage units provided in the transaction apparatus 200. Each storage unit can feed out the stored money onto the transport path. In the withdrawal transaction to dispense money from the transaction apparatus 200, the denomination and quantity of money to be withdrawn are determined, and the determined money is fed out one by one from the corresponding storage unit to the transport path. Then, the fed-out money is transported along the transport path and discharged from the outlet. Since the money depositing/dispensing process performed in the money handling unit 270 has been conventionally known, detailed description thereof is omitted.

The control unit 210 can control the respective units while using the information stored in the memory 230, based on the operations performed by using the operation/display unit 220 and on the information exchanged with the external devices. The respective units being operated under control of the control unit 210 implement the functions and operations of the transaction apparatus 200 according to the present embodiment.

The control unit 210 includes an inventory management unit 211, a condition management unit 212, and a processing unit 213. The inventory management unit 211 manages information on the inventory of money by using the inventory information 231. The condition management unit 212 manages information on transaction conditions by using the transaction condition information 232. Each information management performed by the control unit 210 may include registration of new information, update of registered information, and deletion of registered information. The processing unit 213 controls the code acquisition unit 250, the printing unit 260, and the money handling unit 270 to perform processes related to a transaction.

[Operation Terminal 300]

The operation terminal 300 is implemented by computer equipment, for example. For example, a tablet device or a mobile device can be used as the operation terminal 300. The operation terminal 300 includes a control unit 310, an operation/display unit 320, a memory 330, a communication unit 340, and a code acquisition unit 350. The operation/display unit 320 functions as an operation unit by which various kinds of information are inputted. The operation/display unit 320 also functions as a display that outputs and displays the various kinds of information on a screen. For example, a touch panel type liquid crystal display device is used as the operation/display unit 320. A clerk of the store 3 operates the operation/display unit 320 of the operation terminal 300 to input information related to settings and instructions while confirming the various kinds of information displayed on the screen.

The memory 330 is used for storage of information necessary for implementing the functions and operations of the operation terminal 300. For example, a nonvolatile storage device such as a semiconductor memory is used as the memory 330. The communication unit 340 has a function of communicating with the external devices wirelessly or via wires. The communication unit 340 exchanges information with the external devices via the network 2.

The code acquisition unit 350 reads a graphic code in which information is encoded. The operation terminal 300 acquires the embedded information from the graphic code read by the code acquisition unit 350 to use the information. The information can be exchanged between the operation terminal 300 and the external devices by using the graphic code.

The control unit 310 can control the respective units while using the memory 330, based on the operations performed by using the operation/display unit 320 and on the information exchanged with the external devices. The respective units being operated under control of the control unit 310 implement the functions and operations of the operation terminal 300 according to the present embodiment.

[Money Handling Apparatus 400]

The money handling apparatus 400 is used for depositing and dispensing of money in the store 3. Examples of the money handling apparatus 400 include a change machine used for checkout at a checkout counter in the store 3, and an apparatus used for depositing/dispensing of money in a back office of the store 3. The inventory of money in each money handling apparatus 400 is transmitted to the management apparatus 100, and managed in the inventory information 131 in the management apparatus 100. Since the money handling apparatus 400 is a conventionally known device, detailed description thereof is omitted.

[Mobile Terminal 500]

The mobile terminal 500 is a mobile communication device that communicates with other devices via the network 2. For example, a cellular phone or a tablet device can be used as the mobile terminal 500. The mobile terminal 500 includes a control unit 510, an operation/display unit 520, a memory 530, a communication unit 540, and a code acquisition unit 550. The operation/display unit 520 functions as an operation unit by which various kinds of information are inputted. The operation/display unit 520 also functions as a display that outputs and displays the various kinds of information on a screen. For example, a touch panel type liquid crystal display device is used as the operation/display unit 520. The customer operates the operation/display unit 520 to input information related to settings and instructions while confirming the various kinds of information displayed on the screen.

The memory 530 is used for storage of information necessary for implementing the functions and operations of the mobile terminal 500. For example, a nonvolatile storage device such as a semiconductor memory is used as the memory 530. The communication unit 540 communicates with external devices wirelessly or via wires. The communication unit 540 exchanges information with the external devices via the network 2.

The code acquisition unit 550 reads a graphic code in which information is encoded. The mobile terminal 500 acquires the embedded information from the graphic code read by the code acquisition unit 550 to use the information. The information can be exchanged between the mobile terminal 500 and the external devices by using the graphic code.

The control unit 510 can control the respective units while using the memory 530, based on the operations performed by using the operation/display unit 520 and on the information exchanged with the external devices. The respective units being operated under control of the control unit 510 implement the functions and operations of the mobile terminal 500 according to the present embodiment.

Although not shown in FIG. 2, the mobile terminal 500 recognizes the current location by using a GPS (Global Positioning System). The mobile terminal 500 can display a map on the screen of the operation/display unit 520 and indicate the current location on the map. Moreover, the mobile terminal 500 has a function of retrieving a route from the current location to the store 3 upon receiving location information of the store 3, and calculating a distance to the store 3 and a time required for movement to the store 3.

[Transaction Condition]

The condition management unit 112 of the management apparatus 100 manages transaction conditions for transactions to be performed in the transaction apparatus 200 of the store 3. The transaction conditions are managed in the transaction condition information 132 stored in the memory 130. FIG. 3 shows an example of the transaction condition information 132 in which transaction conditions for deposit transactions are set. As shown in FIG. 3, the transaction conditions are set for each store and for each transaction apparatus. Each store is distinguished from the other stores by store identification information, and each transaction apparatus 200 is distinguished from the other apparatuses 200 by apparatus identification information. A store can be specified by the store identification information indicated under the item of “store” in FIG. 3, and a transaction apparatus 200 in the store can be specified by the apparatus identification information indicated under the item of “apparatus” in FIG. 3. In the store information 133, the location of the store 3 is managed with the store identification information of the store 3, and the installation place of the transaction apparatus 200 in the store 3 is managed with the apparatus identification information of the apparatus 200. By referring to the transaction condition information 132 and the store information 133, each transaction apparatus 200 in each store can be specified and the transaction conditions of the specified transaction apparatus 200 in the specified store can be confirmed. For example, it allows to confirm “transaction conditions for a transaction apparatus 200 installed near an entrance of the store 3”.

The transaction conditions can be set for each transaction type for each transaction apparatus registered under the item of “apparatus” in FIG. 3. Types of the deposit transaction include money change, exchange for points of the store 3 indicated as “store point”, exchange for points of another company (X company) indicated as “point exchange (X company)”, and donation.

The money change is a transaction of depositing money and exchanging the deposited money for money of a different denomination. The exchange for points of the store 3 is a transaction of depositing money and exchanging the deposited money for points usable in the store 3. The exchange for points of another company (X company) is a transaction of depositing money and exchanging the deposited money for points of X company. Although FIG. 3 shows an example of exchange for points of X company, there may be a plurality of companies as exchange partners. In this case, an exchange partner may be selected from among the plurality of companies and the transaction may be performed with the selected exchange partner. The donation is a transaction of depositing money and donating the deposited money. Although FIG. 3 shows an example of donation for support to affected areas, there may be a plurality of donation destinations. In this case, a donation destination is selected from among the plurality of donation destinations and the transaction is performed for the selected donation destination. The commission rate for donation is set to 0 (zero).

As for each transaction type registered under the item of “transaction” in FIG. 3, transaction conditions can be set for each type of transaction partner. Types of transaction partner may include a general customer, a member customer and a member store, of the store 3, as shown in FIG. 3. In the transaction system 1, transaction conditions can be set while designating a store, a transaction apparatus 200, a transaction type, and a transaction partner.

Transaction conditions are set for each transaction partner registered under the item of “transaction partner” in FIG. 3. As a transaction condition, a transaction fee rate is set for each denomination. When at least one of an incentive rate and a commission rate has been set, a sum of the incentive rate being a positive value and the commission rate being a negative value is calculated, and a calculation result is set as a transaction fee rate. If only the incentive rate is set, the transaction fee rate is calculated with the commission rate being 0 (zero). If only the commission rate is set, the transaction fee rate is calculated with the incentive rate being 0 (zero). It is also possible to directly set the transaction fee rate without setting the incentive rate and the commission rate.

The transaction condition information 132 shown in FIG. 3 is managed in the memory 130 of the management apparatus 100 shown in FIG. 2. A part of the transaction condition information 132 is managed as the transaction condition information 232 in the memory 230 of the transaction apparatus 200 shown in FIG. 2. For example, when the identification information of the store 3 shown in FIG. 2 is S001 and the identification information of the transaction apparatus 200 shown in FIG. 2 is M001, information for the apparatus identification information M001 shown in FIG. 3 is managed in the transaction condition information 232 of the transaction apparatus 200 shown in FIG. 2. In other words, a plurality pieces of the transaction condition information 232 managed by the respective transaction apparatuses in the respective stores are combined into the transaction condition information 132 and managed by the management apparatus 100. If there is a change in one of the transaction condition information 132 managed by the management apparatus 100 and the transaction condition information 232 managed by the transaction apparatus 200, this change is also reflected in the other information to synchronize the transaction condition information 132 and the transaction condition information 232.

Transactions performed in the transaction system 1 will be described next. The transaction apparatus 200 can deal with banknotes and/or coins as transaction targets. In the present embodiment, a deposit transaction, in which coins are deposited in the transaction apparatus 200, and a withdrawal transaction, in which coins are withdrawn as change fund from the transaction apparatus 200, will be described as examples of transactions.

[Deposit Transaction]

Figure 4:
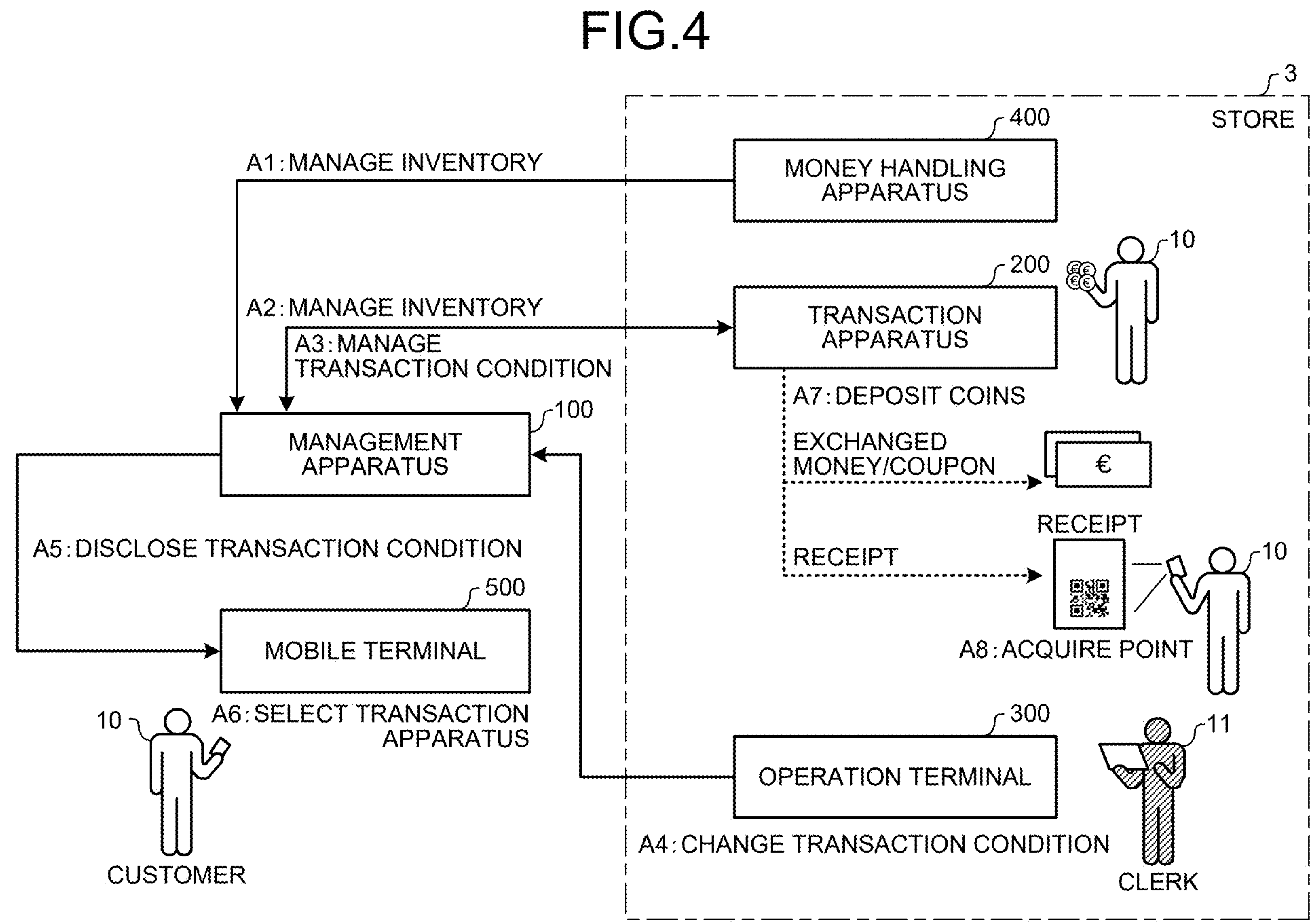
FIG. 4 is a schematic diagram illustrating a deposit transaction performed in the transaction system.

FIG. 4 is a schematic diagram illustrating a deposit transaction performed in the transaction system 1. The deposit transaction includes money change, exchange for points of the store 3, and exchange for points of another company. Hereinafter, a case where a customer 10 in the store 3 exchanges coins for banknotes will be described as an example.

The money handling apparatus 400 installed in the store 3 transmits, to the management apparatus 100, inventory information including the denominations and the number of banknotes stored therein and the denominations and the number of coins stored therein. The inventory management unit 111 of the management apparatus 100 updates the inventory information 131 in the memory 130, based on the inventory information received from the money handling apparatus 400, thereby managing the inventory of money in the money handling apparatus 400 (A1). Likewise, the inventory management unit 211 of the transaction apparatus

200 transmits, to the management apparatus 100, the inventory information 231 including the denominations and the number of banknotes stored therein and the denominations and the number of coins stored therein. The inventory management unit 111 of the management apparatus 100 updates the inventory information 131 in the memory 130, based on the inventory information 231 received from the transaction apparatus 200, thereby managing the inventory of money in the transaction apparatus 200 (A2). The transmission of the inventory information from the apparatus of the store 3 to the management apparatus 100 is performed each time the inventory of money in the apparatus of the store 3 changes.

The condition management unit 112 of the management apparatus 100 manages the transaction conditions for transactions to be performed in the transaction apparatus 200 (A3). The transaction conditions are managed in the transaction condition information 132 as shown in FIG. 3. The condition management unit 112 can automatically set the transaction conditions, based on at least one of the inventory of money in the transaction apparatus 200 and the inventory of money in the money handling apparatus 400, which will be described later.

A clerk 11 of the store 3 can change the transaction conditions for the transaction apparatus 200 through the operation terminal 300 (A4). Specifically, the clerk 11 changes at least one of the incentive rate and the commission rate in the transaction condition information 132 shown in FIG. 3 while designating a denomination, thereby changing the transaction fee rate of this denomination. Alternatively, the clerk 11 may directly change the transaction fee rate of the designated denomination. The date and time when the clerk 11 changed the transaction condition is managed under the item of "update date/time" under the item of "transaction condition" shown in FIG. 3.

For example, the clerk 11 refers to the inventory of money in the transaction apparatus 200 managed in the inventory information 131 of the management apparatus 100, and changes the transaction condition based on the inventory of money. Alternatively, for example, the clerk 11 changes the transaction condition with reference to the inventory information 231 of the transaction apparatus 200. For example, when there is a denomination of coins of which the inventory is likely to decrease and become insufficient in the transaction apparatus 200, the clerk 11 raises the transaction fee rate of the deposit transaction of this denomination. The clerk 11 can raise the transaction fee rate by performing at least one of raising the incentive rate and reducing the commission rate. Meanwhile, for example, when there is a denomination of coins of which the inventory is likely to increase and cause the storage unit to be filled up with coins in the transaction apparatus 200, the clerk 11 reduces the transaction fee rate of the deposit transaction of this denomination. The clerk 11 can reduce the transaction fee rate by performing at least one of reducing the incentive rate and raising the commission rate. There is a case where the store 3 has no right of possession to the money in the transaction apparatus 200, and the clerk 11 of the store 3 cannot change the transaction fee rate. This case will be described later.

When the clerk 11 has changed the transaction condition, the condition management unit 112 of the management apparatus 100 notifies the transaction apparatus 200 of the content of this change. Upon receiving this notification, the condition management unit 212 of the transaction apparatus 200 updates the transaction condition information 232 in the memory 230.

As for the transaction condition changing method, the clerk 11 may not necessarily change the transaction condition information 132 of the management apparatus 100, but may change the transaction condition information 232 of the transaction apparatus 200. Even in this case, the transaction condition information 132 managed in the management apparatus 100 and the transaction condition information 232 managed in the transaction apparatus 200 are synchronized with each other.

The condition management unit 112 of the management apparatus 100 discloses information on the transaction conditions of the transaction apparatus 200 on the network 2, based on the transaction condition information 132 and the store information 133 (A5 in FIG. 4). The condition management unit 112 discloses the transaction conditions of the transaction apparatus 200 installed in each of a plurality of stores. If a plurality of transaction apparatuses 200 are installed in one store, the condition management unit 112 discloses the transaction conditions of each transaction apparatus.

Figure 5B:
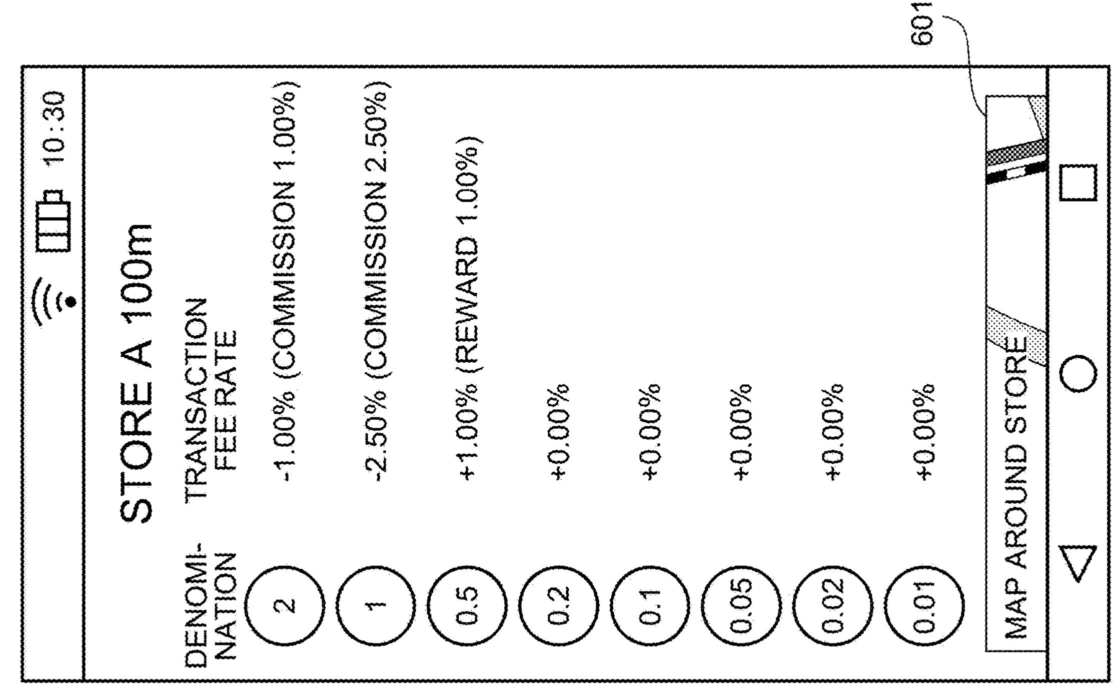
FIGS. 5A and 5B show examples of a browsing screen for transaction conditions displayed on a mobile terminal.
Figure 5A:
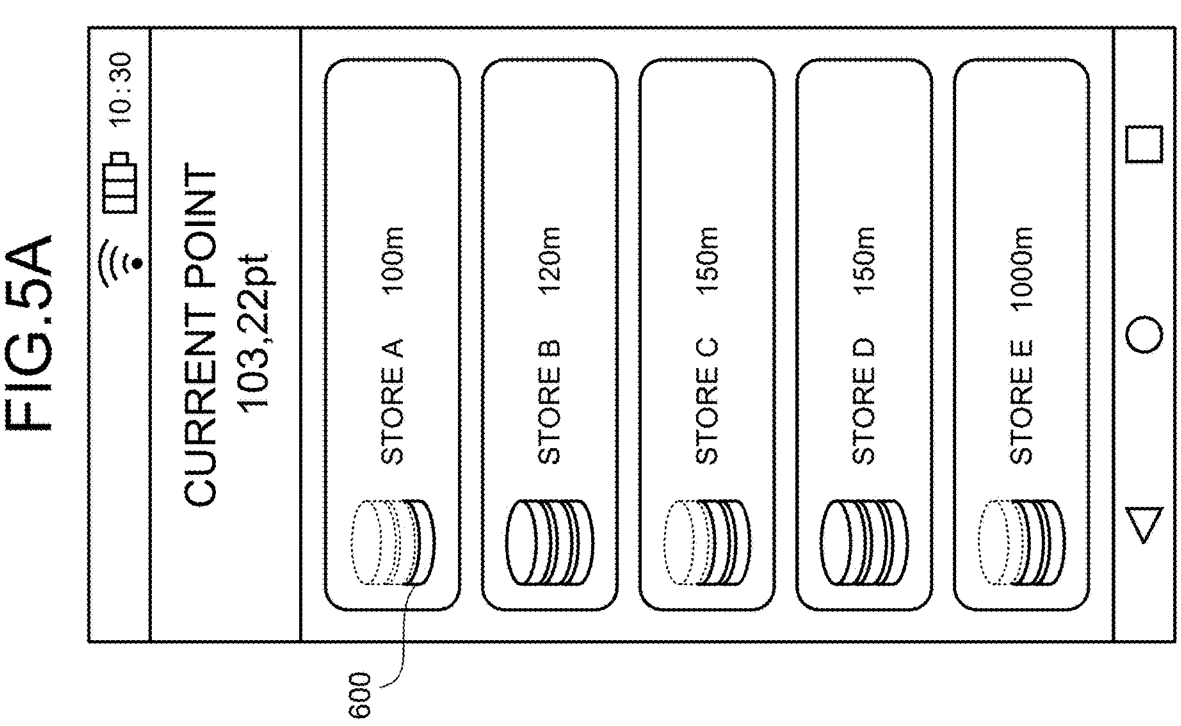

The customer 10 operates the operation/display unit 520 of the mobile terminal 500 to browse the transaction conditions disclosed by the condition management unit 112. FIGS. 5A and 5B show examples of transaction condition browsing screens displayed on the mobile terminal 500. As shown in FIG. 5A, points usable in the store possessed by the customer 10, and information on stores having transaction apparatuses 200 in which the customer 10 can deposit coins, are displayed on the screen. The store information includes the name of each store, and the distance from the current location of the customer 10 to each store. In addition, the store information includes inventory information 600 graphically indicating the inventory of coins in the store. A store having less inventory of coins sets transaction conditions advantageous to the customer 10 in order to make the customer 10 deposit coins in the transaction apparatus 200 in the store. The customer 10 can select a store in which he/she will perform a deposit transaction, with reference to the inventory information 600 and the distance to the store.

When the customer 10 has selected a store on the screen shown in FIG. 5A, transaction information of the selected store is displayed as shown in FIG. 5B. On the screen, the name of the store, the distance from the current location to the store, the transaction conditions including denominations and transaction fee rates, and a map 601 around the store are displayed. The customer 10 can confirm the map 601 by scrolling the screen of the operation/display unit 520. The current location of the customer 10 and the location of the store 3 are indicated on the map 601.

The customer 10 confirms the transaction conditions on the screen shown in FIG. 5B. On the screen, denominations for which the transaction fee rates have negative values and denominations for which the transaction fee rates have values not smaller than 0 are displayed in a distinguishable manner. For example, the denominations having the negative transaction fee rates and the denominations having the transaction fee rates not smaller than 0 are displayed in different colors. Alternatively, for example, the denominations having the transaction fee rates not smaller than 0 may be displayed in a blinking manner, or a certain mark may be put on the left side of the numerical value indicating each denomination, whereby the transaction conditions advantageous to the customer 10 are noticeably displayed.

The customer 10 confirms the transaction conditions, and selects a transaction apparatus 200 in which he/she will deposit coins (A6 in FIG. 4). The customer 10 selects a transaction apparatus 200 for which the transaction conditions are advantageous to the customer 10. For example, the customer 10 may select a transaction apparatus 200 in which the transaction fee rate of the denomination of coins to be deposited by the customer 10 is set to 0 (zero) or more, i.e., a transaction apparatus 200 in which no commission is charged to the customer 10. Moreover, the customer 10 may select a transaction apparatus 200 in which the transaction fee rate has a positive value as large as possible, i.e., a transaction apparatus 200 in which the customer 10 can gain as much reward as possible. The customer 10 having selected a transaction apparatus 200 goes to the store 3 where the transaction apparatus 200 is installed. The customer 10 can use the map 601 displayed on the screen to go to the store 3.

The customer 10 having arrived at the store 3 starts a transaction by performing a predetermined operation on the operation/display unit 220 of the transaction apparatus 200. The customer 10 selects one of three types of transactions, i.e., money change from coins to banknotes, exchange of coins for points of the store 3, and exchange of coins for points of another company. The customer 10 selects money change if he/she wants to exchange coins for banknotes. The customer having selected the transaction type deposits coins into the transaction apparatus 200 (A7).

When the customer 10 has selected the transaction type, the processing unit 213 of the transaction apparatus 200 performs the selected transaction. The processing unit 213 controls the money handling unit 270 to recognize and count the coins deposited into the transaction apparatus 200 by the customer 10. Upon obtaining the coin recognition/counting result, the processing unit 213 refers to the transaction condition information 232 in the memory 230, and calculates a commission or a reward amount, based on the corresponding transaction conditions. If the transaction fee rate has a positive value, an amount of money to be given as a reward to the customer 10 is calculated. If the transaction fee rate has a negative value, an amount of money to be collected as a commission from the customer 10 is calculated. If the customer 10 has been confirmed to be a member of the store 3 through a certain operation performed at the start of the transaction, the processing unit 213 applies the transaction conditions for money change set for member customers. If the customer 10 is a general customer, the processing unit 213 applies the transaction condition for money change set for general customers.

As shown in FIG. 3, the transaction conditions include the transaction fee rate for each denomination. The processing unit 213 calculates a commission or a reward amount for each denomination, based on the number of coins for each denomination which is included in the coin recognition/counting result, and on the transaction fee rate for each denomination which is included in the transaction conditions. Subsequently, the processing unit 213 calculates a total amount of the commissions and the reward amounts for all the denominations. The processing unit 213 displays, on the operation/display unit 220 of the transaction apparatus 200, the recognition/counting result of the coins deposited by the customer 10, and the total amount of the commissions and the rewards. At this time, the operation/display unit 220 may display an initial screen in a state where all the denominations of money are selected, so that the customer 10 can exclude, from the money deposited in the transaction, denominations on which commissions are charged. Alternatively, the operation/display unit 220 may display the initial screen in a state where all the denominations are displayed but none of the denominations are selected, and then may indicate a denomination, that has been selected by the customer 10, as the denomination of money determined to be deposited in the transaction.

The customer 10 having confirmed the display on the operation/display unit 220 can select or change the denomination and the number of coins to be deposited in the transaction so as to reduce the commission or increase the reward amount. If the amount of deposited coins includes a fractional amount that cannot be exchanged for a banknote, the processing unit 213 may perform fraction handling. In the fraction handling, the customer 10 can select a fraction handling method, which will be described later.

If the customer 10 having confirmed the display on the operation/display unit 220 performs an operation of accepting the transaction, the processing unit 213 controls the money handling unit 270 to discharge exchanged banknotes from the outlet, and controls the printing unit 260 to issue a receipt, as indicated by broken lines in FIG. 4. The receipt may include the date and time of the transaction, the recognition/counting result of the coins deposited by the customer 10, and the calculation result obtained from the recognition/counting result and the transaction conditions. Specifically, the receipt may include the number and the amount of the deposited coins for each denomination, the total number and the total amount of the deposited coins, the commission or the reward amount calculated for each denomination of the deposited coins, and the total amount of the commissions and the reward amounts for all the denominations of the deposited coins.

If the total amount of the commissions and the reward amounts for all the denominations of the deposited coins has a positive value, i.e., when a reward amount is given to the customer, this reward amount is given as points of the store 3 to the customer 10. In this case, a graphic code in which information for acquiring the points of the store 3 is encoded, and an expiration date for point acquisition are printed on the receipt. The customer 10 runs a dedicated application on the mobile terminal 500 to access the management apparatus 100, and causes the code acquisition unit 550 to read the graphic code on the receipt, thereby acquiring the points of the store 3 (A8).

Specifically, based on the information acquired from the graphic code in the mobile terminal 500, the point management unit 115 of the management apparatus 100 specifies the customer 10, and adds the points acquired by the customer 10 through the transaction to the points of the customer 10 managed in the point information 135 in the memory 130. This enables the customer 10 to use the acquired points in the store 3. If the customer 10 does not perform the operation for point acquisition by the expiration date, the points gained through the transaction expire.

It can be set that the point management unit 115 changes the number of points according to the transaction history of the customer 10 when adding the points acquired by the customer 10 through the transaction to the points of the customer 10 managed in the point information 135. For example, if the accumulated number of times the customer 10 has used the transaction apparatus 200 exceeds a preset number of times or if the accumulated number of coins the customer 10 has deposited in the transaction apparatus 200 exceeds a preset number of coins, bonus points may be given to the customer 10. The store 3 can set conditions for giving bonus points and the number of bonus points to be given. The point management unit 115 inquires the transaction management unit 114 for information on the customer 10, and determines whether or not the customer 10 satisfies the preset conditions for giving bonus points. If the conditions are satisfied, the point management unit 115 adds the points acquired through the transaction and the bonus points to the points of the customer 10. The customer 10 can confirm the acquired bonus points on the screen of the mobile terminal 500.

The content of the transaction performed in the transaction apparatus 200 is transmitted from the transaction apparatus 200 to the management apparatus 100. The transaction management unit 114 in the management apparatus 100 registers the information received from the transaction apparatus 200 in the transaction information 134 in the memory 130 and manages the registered information. Referring to the transaction information 134 enables confirmation as to who has made what transaction by which transaction apparatus 200 in which store.

[Automatic Change of Transaction Condition]

The transaction conditions managed by the management apparatus 100 can be manually changed by the clerk 11 of the store 3 through the operation terminal 300. Additionally, it can be set that the transaction conditions are automatically changed. The condition management unit 112 can change the transaction conditions, based on the information managed in the inventory information 131. For example, as for the quantity of money stored in the transaction apparatus 200, if there is a denomination of which the quantity is less than a preset lower-limit quantity, the condition management unit 112 raises the transaction fee rate for deposit transaction of this denomination. Meanwhile, when there is a denomination of money of which quantity exceeds a preset upper limit quantity, the condition management unit 112 reduces the transaction fee rate for the deposit transaction of this denomination.

The condition management unit 112 may calculate the quantity of money for each denomination in the store 3, based on the quantity of money for each denomination stored in the transaction apparatus 200 and on the quantity of money for each denomination stored in the money handling apparatus 400, and may change the transaction fee rate for each denomination based on the calculated quantity of money for each denomination in the store 3.

If the transaction fee rate of a certain denomination needs to be changed, for example, the condition management unit 112 calculates a changed transaction fee rate by substituting the quantity of money of this denomination into a preset calculation formula. Alternatively, for example, the condition management unit 112 refers to a table in which the correspondence between the quantity of money and the transaction fee rate is set in advance, and changes the transaction fee rate based on the content of the table.

As described above, the transaction system 1 manages, for each denomination, the quantity of money stored in the transaction apparatus 200 or the quantity of money in the transaction apparatus 200 and the money handling apparatus 400 of the store 3, and automatically adjusts the transaction fee rate according to the situation. As for a transaction with depositing of money into the transaction apparatus 200, the transaction system 1 raises the transaction fee rate of a denomination for which deposit of money into the transaction apparatus 200 is desired, and reduces the transaction fee rate of a denomination for which deposit of money into the transaction apparatus 200 is not desired.

Although described later, the transaction system 1 can also automatically adjust the transaction fee rate for a withdrawal transaction. As for a transaction accompanied by withdrawal of money from the transaction apparatus 200, the transaction system 1 raises the transaction fee rate of a denomination for which withdrawal of money from the transaction apparatus 200 is desired, and reduces the transaction fee rate of a denomination for which withdrawal of money from the transaction apparatus 200 is not desired.

[Deposit Reservation]

When the denomination and the number of coins to be deposited in the transaction apparatus 200 have been decided in advance, the customer 10 can make a reservation for a deposit transaction by operating the mobile terminal 500. When the screen shown in FIG. 5B is scrolled, a reservation button is displayed under the map 601. When the reservation button is pressed, a button for selecting one of three transaction types, i.e., money change, exchange for points of the store 3, and exchange for points of another company, is displayed on the screen. When one of the transaction types is selected, the deposit transaction is reserved with transaction conditions according to the selected transaction type.

Figure 6B:
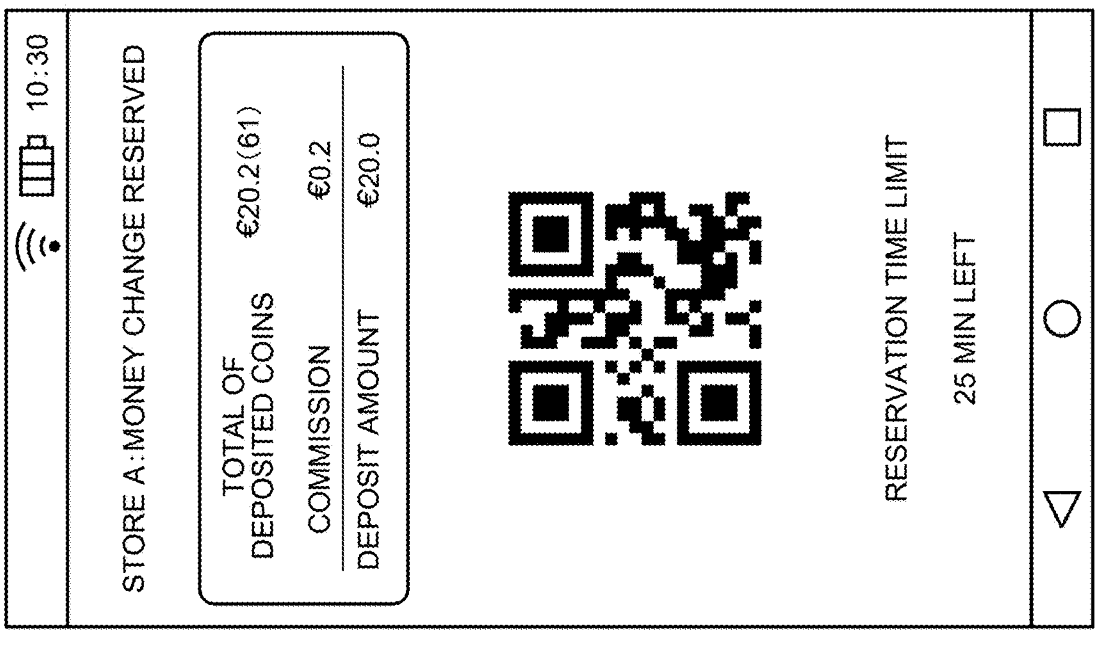
FIGS. 6A and 6B show examples of a screen displayed when a transaction of money change is reserved.
Figure 6A:
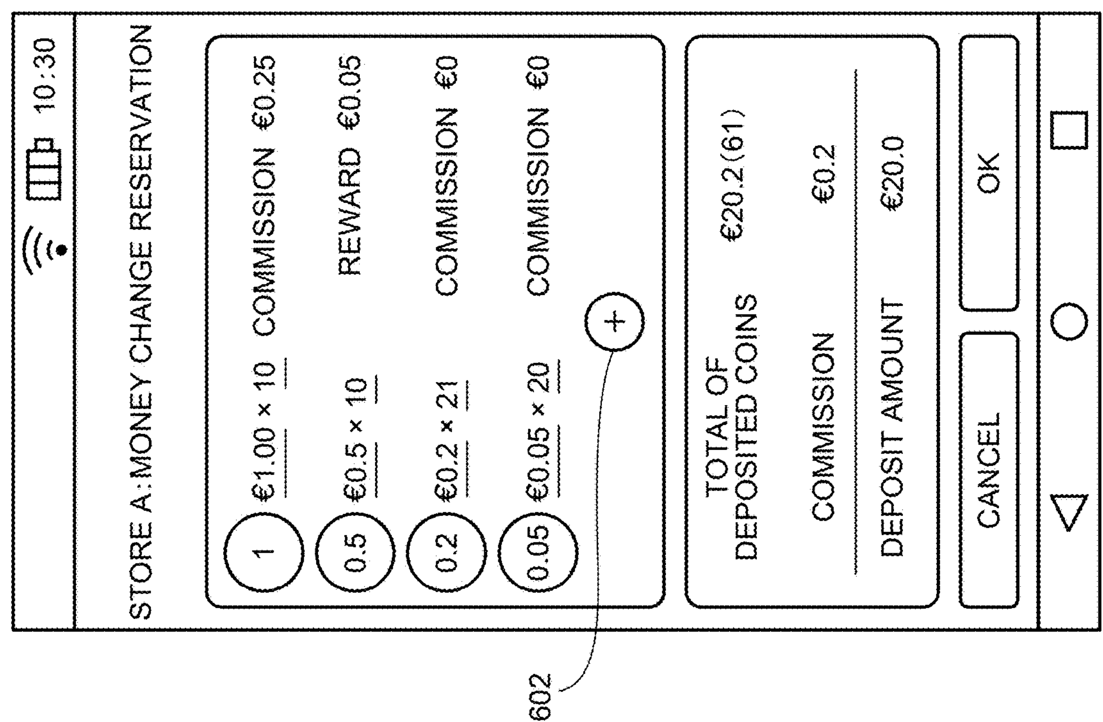

If the customer 10, who wants to exchange coins for banknotes, selects money change, a reservation screen for reserving money change is displayed. FIGS. 6A and 6B show examples of a screen displayed when money change is reserved. FIG. 6A shows an example of the reservation screen. The customer 10 can input the denominations and the number of coins of the denomination to be deposited in the transaction apparatus 200. The customer 10 can perform the input process for one denomination at a time, while pressing a plus button 602 shown in FIG. 6A. The denominations and the number for each denomination of coins, inputted by the customer 10, are listed above the plus button 602. A commission fee or a reward amount, for each denomination, calculated based on the transaction fee rate for each denomination is displayed on the screen. The example shown in FIG. 6A indicates that, if the customer 10 deposits ten 1-euro coins for which the transaction fee rate is set to −2.5% as shown in FIG. 5B, the customer 10 should pay a commission of 0.25 euro for this deposit. Also, FIG. 6A indicates that, if the customer 10 deposits ten 50-cent coins (0.5-euro coins) for which the transaction fee rate is set to +1.0%, the customer 10 can receive a reward of 0.05 euro, i.e., gain a profit of 5 cents, through this deposit.

The total amount and the total number of coins to be deposited by the customer 10 are displayed beneath the plus button 602. In addition, the total amount of the commissions and the reward amounts for all the denominations of the coins to be deposited is displayed. This total amount is displayed as "reward" when the reward amount exceeds the commission, or is displayed as "commission" when the commission exceeds the reward amount. Furthermore, an amount calculated by summing up the total amount of coins to be deposited and the total amount of the commissions and the reward amounts for all the denominations of coins to be deposited is displayed as a deposit amount.

The example shown in FIG. 6A indicates that a commission is required because the commission exceeds the reward amount with respect to all the denominations listed. This example also indicates that, if 61 coins for the total amount of 20.2 euros inputted by the customer 10 are deposited for money change, the deposit amount of 20 euros (=20.2 euros −0.2 euro as a commission) is exchanged for banknotes.

The customer 10 can stop the reservation operation by pressing a cancel button on the screen shown in FIG. 6A. If the customer 10 presses an OK button, the reservation is made, and a screen shown in FIG. 6B is displayed. On the screen, information on the coins reserved to be deposited, a graphic code in which the reservation content is encoded, and a reservation time limit by which the customer 10 can perform the reserved transaction are displayed. The customer 10 can perform the reserved transaction by causing the code acquisition unit 250 of the transaction apparatus 200 to read the graphic code displayed on the screen of the mobile terminal 500 before the reservation time limit expires. When the reservation time limit has expired, the reservation is canceled and the customer 10 cannot perform the reserved transaction.

The content of the transaction reserved by using the mobile terminal 500 is managed by the management apparatus 100. Specifically, the transaction management unit 114 of the management apparatus 100 registers the reservation information in the transaction information 134 in the memory 130 and manages the registered information. The clerk 11 of the store 3 runs a dedicated application on the operation terminal 300 to browse the reservation information managed by the management apparatus 100. Based on the reservation information, the clerk 11 can change the transaction conditions while confirming the denomination and the number of coins for which deposit reservation was made.

The transaction management unit 114 of the management apparatus 100 transmits the reservation information to the transaction apparatus 200. In the transaction apparatus 200 having received the reservation information, the inventory management unit 211 manages the content of the reservation. The inventory management unit 211 manages the inventory of money in the transaction apparatus 200 so as to implement the reserved transaction. The processing performed by the processing unit 213 is restricted according to the management of the inventory management unit 211. Specifically, the inventory management unit 211 manages the inventory number of coins such that all the coins for which deposit reservation was made can be deposited in the transaction apparatus 200, that is, so as to avoid a situation that the storage unit in the transaction apparatus 200 becomes full and some of the coins of the reserved transaction cannot be stored therein. Moreover, the inventory management unit 211 manages the inventory number of banknotes such that banknotes corresponding to an amount of the coins for which deposit reservation was made can be withdrawn from the transaction apparatus 200, that is, so as to avoid a situation that money change for the reserved transaction cannot be performed because of shortage of banknotes that can be used for the money change. Securing of the storage space for the coins to be deposited and securing of banknotes for money change are performed until the reservation time limit expires. Thus, the customer 10 who has reserved the deposit transaction can surely perform the reserved transaction.

[Operation of Transaction Apparatus]

Figures 7A, 7B:
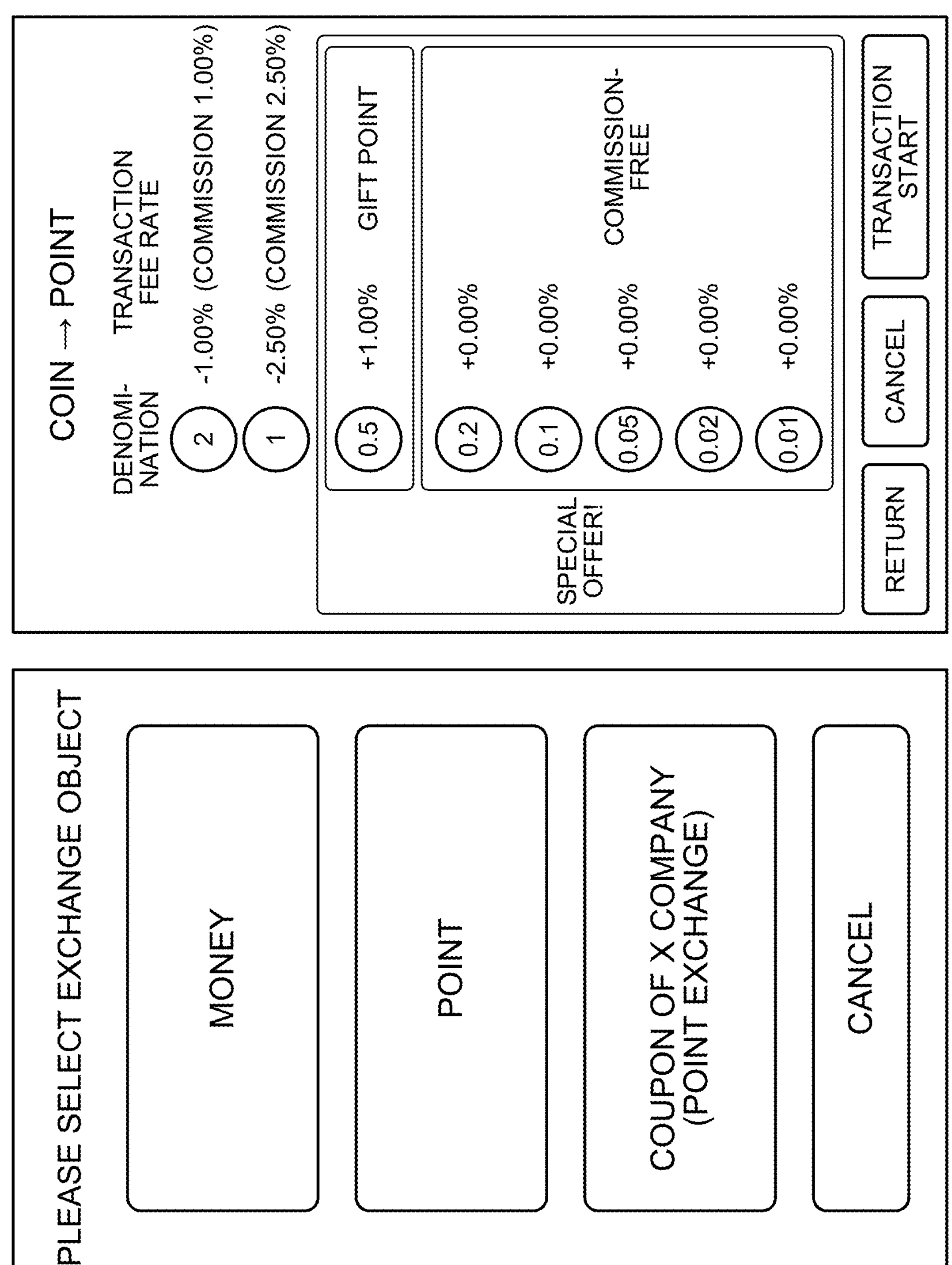
FIGS. 7A and 7B show examples of a screen displayed when a deposit transaction is performed.

The operation of the transaction apparatus 200 will be described. FIGS. 7A and 7B show examples of a screen displayed on the operation/display unit 220 of the transaction apparatus 200 during a deposit transaction. FIG. 7A shows a screen for selecting an exchange target for which deposited coins are exchanged, that is, for selecting a transaction type. The customer selects an exchange target on this screen. If the customer selects a button indicating "money" on the screen, a process of a transaction of exchanging the deposited coins for money is started. If the customer selects a button indicating "point", a process of a transaction of exchanging the deposited coins for points usable in the store is started. If the customer selects a button indicating "coupon of X company", a process of a transaction of issuing a coupon for exchanging the deposited money for points usable in the X company is started. If the customer selects a button indicating "cancel" on the screen, the processing is stopped and the transaction apparatus 200 enters a stand-by state.

If the customer presses the "point" button on the screen shown in FIG. 7A, the current transaction conditions for this transaction are displayed as shown in FIG. 7B. Then, denominations of coins that can be deposited in the transaction apparatus 200 and the transaction fee rate for each denomination are displayed on the screen.

On the screen of the operation/display unit 220, denominations for which the transaction conditions are advantageous to the customer are displayed in a distinguishable manner from the other denominations. For example, two denominations, i.e., 2-euro coin and 1-euro coin, for which the customer should pay commissions are displayed to be distinguishable from the other denominations for which the message "special offer" is displayed as shown in FIG. 7B. Moreover, a denomination for which a reward is given through the transaction is displayed in a distinguishable manner from a denomination for which no commissions are charged. The denomination for which a reward is given through the transaction is displayed with the message "gift point" while the denomination for which no commissions are charged is displayed with the message "commission-free".

The customer can return to the selection screen shown in FIG. 7A by pressing a return button located on a lower side of the screen shown in FIG. 7B. If the customer presses a cancel button, the processing is stopped and the transaction apparatus 200 enters a stand-by state. If the customer presses a transaction start button, the transaction of depositing coins and exchanging the coins for points of the store is started.

Figure 8:
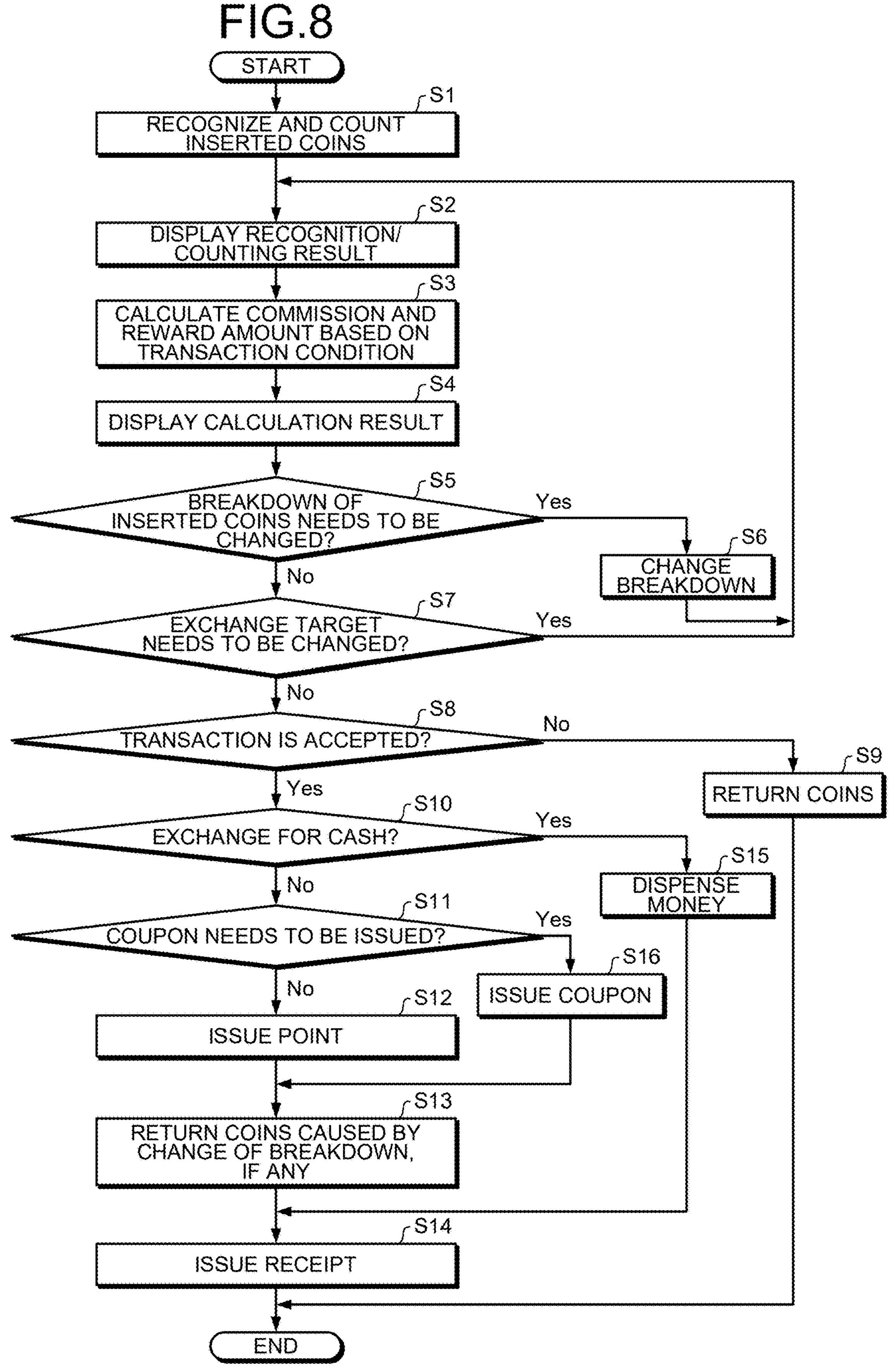
FIG. 8 is a flowchart showing a flow of processing performed in a transaction apparatus.

FIG. 8 is a flowchart showing the flow of the processing performed in the transaction apparatus 200. When the customer, who has started the transaction of exchanging coins for points, inserts coins in the inlet of the transaction apparatus 200, the processing unit 213 controls the money handling unit 270 to recognize and count the coins (step S1). The recognized and counted coins are stored in the storage units for each denomination. The processing unit 213 displays the recognition/counting result of the inserted coins on the screen of the operation/display unit 220 (step S2).

Upon obtaining the recognition/counting result, the processing unit 213 reads out, from the transaction condition information 232 managed in the memory 230, the transaction conditions for the transaction of exchanging the deposit amount for points of the store. Then, based on the transaction conditions and the coin recognition/counting result, the processing unit 213 calculates a commission or a reward amount for each denomination, and calculates a total amount of commissions and reward amounts for all the denominations (step S3). The processing unit 213 displays the calculation result on the screen of the operation/display unit 220 (step S4).

Figure 9:
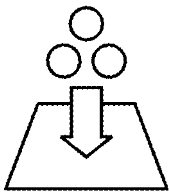
FIG. 9 shows an example of a screen on which a recognition/counting result and a calculation result and a commission/reward calculation result are displayed.

FIG. 9 shows an example of the screen on which the recognition/counting result and the calculation result of the commissions and the reward amounts are displayed. The denominations of the coins deposited by the customer, the number and the amount of the coins for each denomination, the transaction fee rate for each denomination, and the commission or the reward amount for each denomination, are displayed on the screen. Moreover, the total number and the total amount of the deposited coins, and the total amount of the commissions and the reward amounts for all the denominations of the deposited coins, are displayed. Under the cell for "commission/reward", the values of percentage (%) indicate the transaction fee rates, the negative amounts of euro indicate the commissions, and the positive amounts of euro indicate the reward amounts.

On the screen shown in FIG. 9, the customer can confirm that the deposited coins include twenty 1-euro coins, i.e., 20 euros. In addition, the customer can confirm that the transaction fee rate for 1-euro coin is set to −2.5%, and −0.5 euro, i.e., a commission of 0.5 euro, is charged on the transaction of the twenty 1-euro coins. Moreover, the customer can confirm that the total number of the deposited coins is 278 and the total amount is 100.4 euros, and 100.2 euros (=100.4 euros −0.2 euro as a commission) will be settled as a deposit amount if the process is progressed.

If the customer presses the cancel button on the lower side of the screen shown in FIG. 9, the process is stopped, and all the deposited coins are returned from the outlet. The customer can change the denominations and the number for each denomination of the deposited coins by pressing a coin change button. The customer can progress the process by pressing a button indicating "next".

If the customer wants to additionally insert coins (FIG. 8, step S5; Yes), the customer only has to insert additional coins in the inlet. When the customer has inserted the additional coins in the inlet (step S6), this insertion is detected, and the added coins are automatically recognized and counted (step S2). Then, the display on the screen is updated so as to include the additionally inserted coins (steps S3, S4).

If the customer wants to decrease the already inserted coins, the customer presses the coin change button (step S5; Yes) and changes the breakdown of the inserted coins (step S6). For example, if the customer wants to cancel deposit of coins having a high commission, the customer can designate the denomination and the number of coins to be excluded from the deposit transaction.

When the customer presses the coin change button shown in FIG. 9 and selects a denomination of coins he/she wants to change the number thereof, a window for changing the number of coins of the selected denomination is displayed. FIGS. 10A and 10B show examples of a screen including a window 603 for changing the number of coins. FIG. 10A shows an example of the window 603 for changing the number of 1-euro coins.

The window 603 shows the current number and amount of coins of the denomination selected by the customer, and the total amount of the commissions and the reward amounts for all the denominations of the deposited coins. Beneath them, reference information indicating candidates for change of the number of coins is displayed. The processing unit 213 can calculate the number of coins that causes the total amount of the commissions and the reward amounts for all the denominations to be 0 (zero), and display the calculated number of coins as a candidate in the window 603. The processing unit 213 can calculate the total amount of the commissions and the reward amounts for all the denominations when the number of coins is set to 0, and display the calculated amount as a candidate. Specifically, FIG. 10A indicates that, the current commission is 0.2 euro, and if the number of 1-euro coins is changed from 20 to 12, the total amount of the commissions and the reward amounts for all the denominations will be 0 (zero) and therefore no commission is required. In addition, FIG. 10A indicates that, if the number of 1-euro coins is changed to 0, the total amount of the commissions and the reward amounts for all the denominations will be +0.3 euro and therefore no commission is required and a reward of 0.3 euro can be gained.

The customer can change the number of coins, with reference to the information displayed as the candidates in the window 603. In a rectangular frame 604 shown in FIG. 10A, the current number of coins is displayed. When the customer touches the frame 604, a numeric keypad is displayed. The customer inputs the number of coins with the numeric keypad, and presses an OK button in the window 603, whereby the number of coins is changed.

When the number of coins has been changed, steps S2 to S4 shown in FIG. 8 are performed again, and the display on the screen is updated based on the changed number of coins. FIG. 10B shows an example of the screen displayed after the change in the number of coins. When the customer has changed the number of 1-euro coins from 20 to 0 in the window 603 shown in FIG. 10A, the screen shown in FIG. 10B is displayed. As shown in FIG. 10B, on the screen after the change in the number of coins, the numeric values changed due to the change in the number of coins are displayed to be distinguishable from the other numeric values. Specifically, the changed numeric values are enclosed by rectangles.

On the screen shown in FIG. 10B, the customer can confirm that the change in the number of 1-euro coins from 20 to 0 causes the commission for 1-euro coins to be changed to 0 euro, and causes the total amount of the commissions and the reward amounts for all the denominations to be changed to +0.3 euro. Moreover, the customer can confirm that the total number and the total amount of coins to be deposited in the transaction is changed to 258 and 80.4 euros, respectively, and that the deposit amount is changed to 80.7 euros (=80.4 euros+0.3 euro as a reward amount).

If the customer has determined that the number of coins need not be changed after confirming the screen shown in FIG. 9 or FIG. 10B, the customer presses a button indicating "next" to progress the processing (FIG. 8, step S5; No). Then, a screen requesting the customer to perform final confirmation is displayed.

Figure 11:
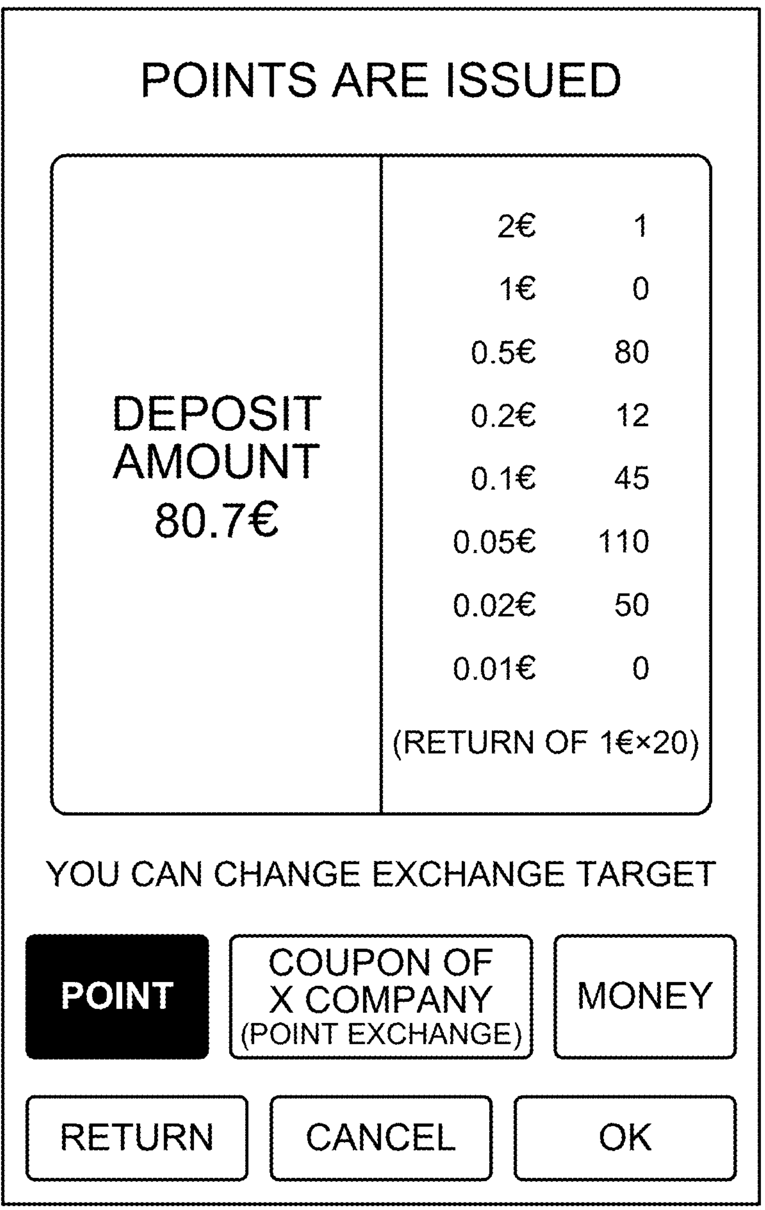
FIG. 11 shows an example of a screen for finally confirming a transaction.

FIG. 11 shows an example of the screen for the final confirmation in the transaction. The number of coins for each denomination to be deposited and the deposit amount are displayed on the screen. In addition, buttons indicating options of exchange targets for the deposit amount are displayed. The customer can change the exchange target of the deposit amount, i.e., the transaction type, on this screen (FIG. 8, step S7). The buttons indicating the options of exchange targets are identical to the buttons displayed on the transaction selection screen shown in FIG. 7. The option being currently selected is displayed in a distinguishable manner from the other options. FIG. 11 shows an example in which the transaction of exchanging the deposit amount for points of the store is currently selected. If the customer has changed the exchange target of the deposit amount on the screen shown in FIG. 11 (FIG. 8, step S7; Yes), steps S2 to S4 are performed again with the transaction conditions of the changed exchange target.

If the customer has not changed the exchange target of the deposit amount (step S7; No) and has pressed a cancel button on a lower side of the screen shown in FIG. 11 (step S8; No), the processing unit 213 stops the transaction and discharges all the deposited coins to the outlet to return these coins to the customer (step S9), thereby ending the processing. On the other hand, if the customer accepts the transaction by pressing an OK button shown in FIG. 11 (FIG. 8, step S8; Yes), the processing unit 213 progresses the processing according to the content of the transaction.

When the transaction has been accepted, the processing unit 213 transmits the content of the accepted transaction to the management apparatus 100. The transaction management unit 114 of the management apparatus 100 registers the received information in the transaction information 134 in the memory 130 and manages the registered information. The information managed in the transaction information 134 includes, for example, the identification information of the store, the identification information of the transaction apparatus 200, the date and time of the transaction, the denominations of the deposited coins, the number and the amount of the deposited coins for each denomination, and the total number and the total amount of the deposited coins. The information further includes the commission or the reward amount for each denomination, the total amount of the commissions and the reward amounts for all the denominations, and the deposit amount calculated by summing up the total amount of the deposited coins and the total amount of the commissions and the reward amounts for all the denominations. The information further includes points given to the customer, if any.

When the transaction of exchanging the deposit amount for points of the store has been selected (FIG. 8, steps S10 and S11; No), the processing unit 213 issues points equivalent to the deposit amount (step S12). If there are coins to be returned to the customer because the breakdown of the deposited coins has been changed as described with reference to FIG. 10, the processing unit 213 controls the money handling unit 270 to return the coins from the outlet (FIG. 8, step S13). For example, on the screen shown in FIG. 10, if the customer changes the number of 1-euro coins to be deposited coins from 20 to 0, twenty 1-euro coins are returned to the customer from the outlet. The processing unit 213 controls the printing unit 260 to issue a receipt (FIG. 8, step S14), thereby ending the processing.

The date and time of the transaction, the denominations of the deposited coins, the number and the amount of the deposited coins for each denomination, and the total number and the total amount of the deposited coins, are printed on the receipt. Furthermore, the commission or the reward amount for each denomination, the total amount of the commissions and the reward amounts for all the denominations, and the deposit amount calculated by summing up the total amount of the deposited coins and the total amount of the commissions and the reward amounts for all the denominations, are printed on the receipt. Moreover, a graphic code, in which information for acquiring the points exchanged from the deposit amount is encoded, is printed on the receipt. The customer can acquire the points by reading the graphic code through the mobile terminal 500 as described above.

When the transaction of exchanging the deposit amount of coins for money has been selected (step S10; Yes), the processing unit 213 controls the money handling unit 270 to discharge the exchanged money from the outlet (step S15). At this time, if there are coins to be returned to the customer because the breakdown of the deposited coins has been changed as described with reference to FIG. 10, these coins are returned from the outlet with the exchanged money. The processing unit 213 controls the printing unit 260 to issue a receipt (FIG. 8, step S14), thereby ending the processing. The date and time of the transaction, the denominations of the deposited coins, the number and the amount of the deposited coins for each denomination, and the total number and the total amount of the deposited coins, are printed on the receipt. Furthermore, the commission or the reward amount for each denomination, the total amount of the commissions and the reward amounts for all the denominations, and the deposit amount calculated by summing up the total amount of the deposited coins and the total amount of the commissions and the reward amounts for all the denominations, are printed on the receipt. Moreover, the denominations of the exchanged money, and the number and the amount of the exchanged money for each denomination are printed on the receipt.

If the customer has gained a reward amount through the transaction, a graphic code in which information for acquiring points of the store corresponding to the reward amount is encoded, and an expiration date for acquisition of the points, are printed on the receipt. As described above, the customer can acquire the points by reading the graphic code through the mobile terminal 500. If the customer 10 does not perform the operation for point acquisition by the expiration date, the points gained through the transaction expire.

When the transaction of exchanging the deposit amount of coins for points of the X company has been selected (step S10; No, step S11; Yes), the processing unit 213 issues a coupon for acquiring the points of the X company (step S16). If there are coins to be returned to the customer because the breakdown of the deposited coins has been changed as described with reference to FIG. 10, the processing unit 213 controls the money handling unit 270 to return the coins from the outlet (step S13). The processing unit 213 controls the printing unit 260 to issue a receipt (step S14), thereby ending the processing. The customer can acquire the issued coupon of the X company by the receipt.

The date and time of the transaction, the denominations of the deposited coins, the number and the amount of the deposited coins for each denomination, and the total number and the total amount of the deposited coins, are printed on the receipt. Furthermore, the commission or the reward amount for each denomination, the total amount of the commissions and the reward amounts for all the denominations, and the deposit amount calculated by summing up the total amount of the deposited coins and the total amount of the commissions and the reward amounts for all the denominations, are printed on the receipt. Moreover, a graphic code, in which information for acquiring the coupon of the X company is encoded, is printed on the receipt. The customer runs a dedicated application on the mobile terminal 500, and causes the code acquisition unit 550 to read the graphic code, thereby acquiring the coupon of the X company. Specifically, firstly, the point management unit 115 of the management apparatus 100 recognizes the information embedded in the graphic code, communicates with a management apparatus of the X company, and pays the deposit amount deposited by the customer to the X company to acquire a coupon code exchangeable for points of the X company. The point management unit 115 displays the acquired coupon code on the mobile terminal 500 of the customer. The customer can acquire the points of the X company by using the coupon code displayed on the mobile terminal 500. For example, the customer accesses the website of the X company, and inputs the coupon code to acquire the points usable for the X company.

[Handling of Fractional Amount]

When the deposit amount of coins is exchanged for banknotes, there is a case where a fractional amount, which cannot be exchanged for a banknote, has to be handled. In the transaction apparatus 200, the customer can select how to handle a fractional amount in a transaction. When the deposit amount has become apparent after coins inserted in the transaction apparatus 200 by the customer are recognized and counted, and commissions and reward amounts for the coins are calculated, the processing unit 213 determines whether or not the deposit amount includes a fractional amount that cannot be exchanged for a banknote. If the deposit amount includes a fractional amount, options for handling such a fractional amount are displayed on the screen of the operation/display unit 220.

FIGS. 12A and 12B show examples of a screen displayed when a fractional amount is included in the deposit amount. On the screen shown in FIG. 12A, the denominations of the coins, the number and the amount of the coins for each denomination, the transaction fee rate for each denomination, and the commission or the reward amount for each denomination, are displayed. Furthermore, the total number and the total amount of the coins, the total amount of the commissions and the reward amounts for all the denominations, and the deposit amount, are displayed on the screen. Moreover, since the deposit amount includes the fractional amount that cannot be exchanged for a banknote, information indicating that the fractional amount is included, options of fraction handling methods, and information requesting selection of a fraction handling method, are displayed on the screen. In the example shown in FIG. 12A, the deposit amount calculated by subtracting the commission from the total amount of the coins is 100.2 euros, that is, a fractional amount of 0.2 euro that cannot be exchanged for a banknote is included in the deposit amount.

The customer can select a fraction handling method from "coin return" and "point exchange" shown in FIG. 12A. The "coin return" is a method of eliminating the fractional amount by returning a part of the deposited coins. The "point exchange" is a method of exchanging the fractional amount for points usable in the store.

When the customer has selected "point exchange" on the screen shown in FIG. 12A, the processing is progressed as described with reference to FIG. 8 since the fractional amount of the deposit amount can be exchanged for points. After the customer accepts the transaction, the processing unit 213 exchange the fractional amount for points of the store and controls the money handling unit 270 to discharge banknotes, which has been exchanged from the coins, from the outlet. In the example shown in FIG. 12A, 100 euros are discharged as banknotes, and the fractional amount of 0.2 euro is exchanged for points of the store. Acquisition of the points exchanged from the fractional amount is performed by using a graphic code printed on a receipt, as in the case of exchanging the deposit amount for points.

When the customer has selected "coin return" on the screen shown in FIG. 12A, the processing unit 213 changes the breakdown of the deposited coins so that the deposit amount has no fractional amount. The processing unit 213 determines the denominations and the number of coins for each denomination to be returned so that the number of coins to be returned is minimized.

In the example shown in FIG. 12A, there is a fractional amount of 0.2 euro. The fractional amount of 0.2 euro can be returned by combining coins of 0.1 euro, 0.05 euro, and the like. In order to minimize the number of coins to be returned, the processing unit 213 determines to return one 0.2-euro coin. After determining the denominations and the number of coins for each denomination to be returned, the processing unit 213 updates the screen shown in FIG. 12A to a screen shown in FIG. 12B.

The processing unit 213 may determine the denominations and the number of coins for each denomination to be returned, based on the transaction fee rate for the coins to be returned. For example, it can be set that coins of a denomination having a higher commission rate are preferentially returned.

As shown in FIG. 12B, on the screen after "coin return" has been selected, information indicating that one 0.2-euro coin out of the deposited coins will be returned, and a deposit amount having no fractional amount, are displayed. After the customer accepts the transaction, the processing unit 213 controls the money handling unit 270 to discharge, from the outlet, banknotes for 100 euros, and one 0.2-euro coin of which the amount has been excluded from the deposited amount of coins in order to eliminate the fractional amount from the deposited amount.

[Withdrawal Transaction]

A transaction apparatus 200 installed in a store can be used not only for a deposit transaction but also for a withdrawal transaction for change fund. A large quantity of money is stored in the transaction apparatus 200. A withdrawal transaction in a case where the store having the transaction apparatus 200 installed therein has the right of possession to the money stored in the transaction apparatus 200, will be described.

Figure 13:
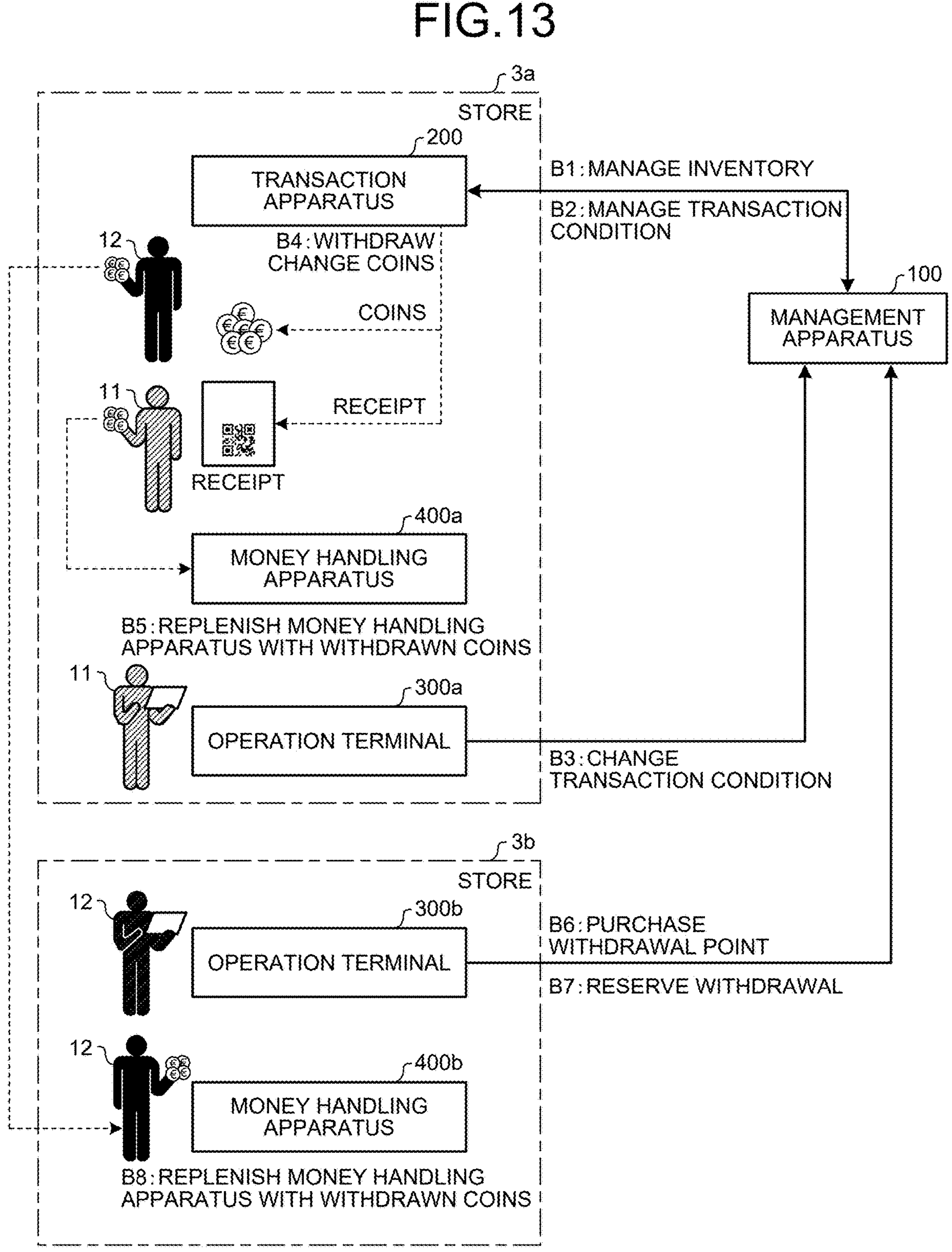
FIG. 13 is a schematic diagram illustrating a withdrawal transaction for withdrawing change fund from the transaction apparatus.

FIG. 13 is a schematic diagram illustrating a withdrawal transaction of withdrawing change fund from the transaction apparatus 200. The transaction apparatus 200 is installed in a store 3*a*. A money handling apparatus 400 (400*a*, 400*b*) is installed in each of stores 3*a* and 3*b*. In addition, an operation terminal 300 (300*a*, 300*b*) is installed in each of the stores 3*a* and 3*b*.

A management company manages the inventory of money stored in the transaction apparatus 200 in the store 3*a*, by using a management apparatus 100 (B1). Moreover, the management apparatus 100 manages transaction conditions for the transaction apparatus 200 (B2). The store 3*a* having the transaction apparatus 200 installed therein has the right of possession to the money stored in the transaction apparatus 200. The store 3*a* can withdraw money from the transaction apparatus 200 and use the money in the store 3*a*.

A clerk 11 of the store 3*a* can change the transaction conditions for the withdrawal transaction to be performed in the transaction apparatus 200, by operating the operation terminal 300*a* (B3). While FIG. 3 shows the transaction conditions for the deposit transaction, the transaction conditions managed by the management apparatus 100 also include the transaction conditions for the withdrawal transaction. FIG. 14 shows an example of the transaction conditions for a withdrawal transaction of change fund. In FIG. 14, identification information of the store 3*a* is S002, identification information of the transaction apparatus 200 installed in the store 3*a* is M010, and identification information of the store 3*b* is S003. As for the transaction apparatus 200 installed in the store 3*a*, the transaction fee rate for the store 3*a* having the right of possession to the money in the apparatus 200 is set to 0 (zero) for all denominations as shown in FIG. 14. Meanwhile, the transaction fee rate for the store 3*b* is set to different values for each denomination.

For example, when it is predicted that coins of a certain denomination will become insufficient in the money handling apparatus 400*a*, the clerk 11 withdraws coins of this denomination from the transaction apparatus 200 (B4 in FIG. 13), and replenishes the money handling apparatus 400*a* with the coins (B5). Although the transaction conditions are applied to the withdrawal transaction, since the transaction fee rate for the store 3*a* is 0%, the store 3*a* can withdraw the coins without commissions.

If a clerk 12 of the store 3*b* wants to withdraw change fund from the transaction apparatus 200 in the store 3*a*, he/she has to acquire withdrawal points in advance. The clerk 12 purchases the withdrawal points by operating the operation terminal 300*b* (B6). 1 withdrawal point is sold at 1 euro. The price of the withdrawal points purchased by the clerk 12 is paid to the store 3*a*. The clerk 12 can pay for the price of the withdrawal points by using a credit card, a pre-paid card, a check, a bank account, or the like.

The point management unit 115 of the management apparatus 100 manages the withdrawal points purchased by the clerk 12 in association with the identification information of the store 3*a*. The clerk 12 can reserve withdrawal of change fund by operating the operation terminal 300*b* (B7), which will be described later.

For example, when the inventory of money in the money handling apparatus 400*b* in the store 3*b* decreases and the clerk 12 needs to add change fund in the money handling apparatus 400, the clerk 12 goes to the store 3*a*. Then, the clerk 12 starts a withdrawal transaction by operating the operation/display unit 220 of the transaction apparatus 200. The processing unit 213 of the transaction apparatus 200 requests the clerk 12 to input a user ID and a password having been assigned to the store 3*b* in advance, and performs an identification process. The user ID and the password used for the identification process are managed as identification information in the memory 130 of the management apparatus 100. The processing unit 213 acquires the identification information from the management apparatus 100, and performs the identification process. The processing unit 213 recognizes, from result of the identification process, that the clerk 12 performs the withdrawal transaction by using the withdrawal points of the store 3*b*.

The clerk 12 designates denominations and the quantity for each denomination of the change fund to be withdrawn, by operating the operation/display unit 220. Based on the transaction conditions for the withdrawal transaction set for the store 3*b*, the processing unit 213 calculates a commission or a reward amount for each denomination, and calculates a total amount of commissions and reward amounts for all denominations.

For example, if the clerk 12 designates change fund of 500 euros and the total amount calculated by the processing unit 213 is a commission of 5 euros, the clerk 12 needs 505 points (withdrawal points) to withdraw the change fund of 500 euros. Meanwhile, if the total amount calculated by the processing unit 213 is a reward amount of 5 euros, the clerk 12 can withdraw the change fund of 500 euros by using 495 points (withdrawal points). On the screen of the operation/display unit 220, information related to the change fund and the number of withdrawal points required for the withdrawal of the change fund are displayed.

When the clerk 12 has confirmed the displayed content and pressed an OK button, the processing unit 213 of the transaction apparatus 200 controls the money handling unit 270 to withdraw the change fund designated by the clerk 12. Moreover, the processing unit 213 controls the printing unit 260 to issue a receipt. On the receipt, the identification information of the store 3*a*, the identification information of the transaction apparatus 200, the date and time of the transaction, and information related to the withdrawn change fund are printed. The information related to the change fund includes the denominations of the change fund, the quantity and the amount of the change fund for each denomination, and the total number and the total amount of the change fund. The information related to the change fund further includes the commission or the reward amount for each denomination, the total amount of the commissions and the reward amounts for all the denominations, the number of the withdrawal points used by the clerk 12, and the balance of withdrawal points of the store 3*b*.

The processing unit 213 transmits the content of the withdrawal transaction to the management apparatus 100. The transaction management unit 114 of the management apparatus 100 registers the received information in the transaction information 134 in the memory 130 and manage the registered information. The point management unit 115 of the management apparatus 100 subtracts the withdrawal points used for the withdrawal transaction from the withdrawal points of the store 3*b* which are managed in the point information 135 in the memory 130. The clerk 12 brings the change fund withdrawn from the transaction apparatus 200 to the store 3*b*, and replenishes the money handling apparatus 400*b* with the change fund (B8).

When the clerk 12 needs to withdraw a plurality of denominations of coins as change fund, the transaction apparatus 200 discharges the coins one denomination at a time and repeats the discharge until the coins of all denomination are discharged from the transaction apparatus 200. The clerk 12 can take out the coins from the outlet, pack the coins in different containers for each denomination, and bring the coins of each denomination to the store 3*b*.

The transaction apparatus 200 may discharge coins into a money cassette used in the money handling apparatus 400 (400*a*, 400*b*). In the money handling apparatus 400, replenishment of money may be performed by using the detachable money cassette. Specifically, when money for replenishment is stored in the money cassette and the money cassette is mounted to the money handling apparatus 400, the money is fed out from the money cassette and supplied into storage units inside the money handling apparatus 400. The money handling unit 270 of the transaction apparatus 200 is configured such that the money cassette is detachably mounted thereto. The clerk 12 mounts the money cassette to the transaction apparatus 200, and the transaction apparatus 200 discharges the change fund into the money cassette. After the change fund is stored in the money cassette, the clerk 12 dismounts the money cassette from the transaction apparatus 200 and brings the money cassette to the store 3*b*. Then, the clerk 12 mounts the money cassette to the money handling apparatus 400*b*, and the change fund stored in the money cassette is fed out therefrom and stored in the storage unit in the money handling apparatus 400*b*.

[Withdrawal Reservation]

Figure 15:
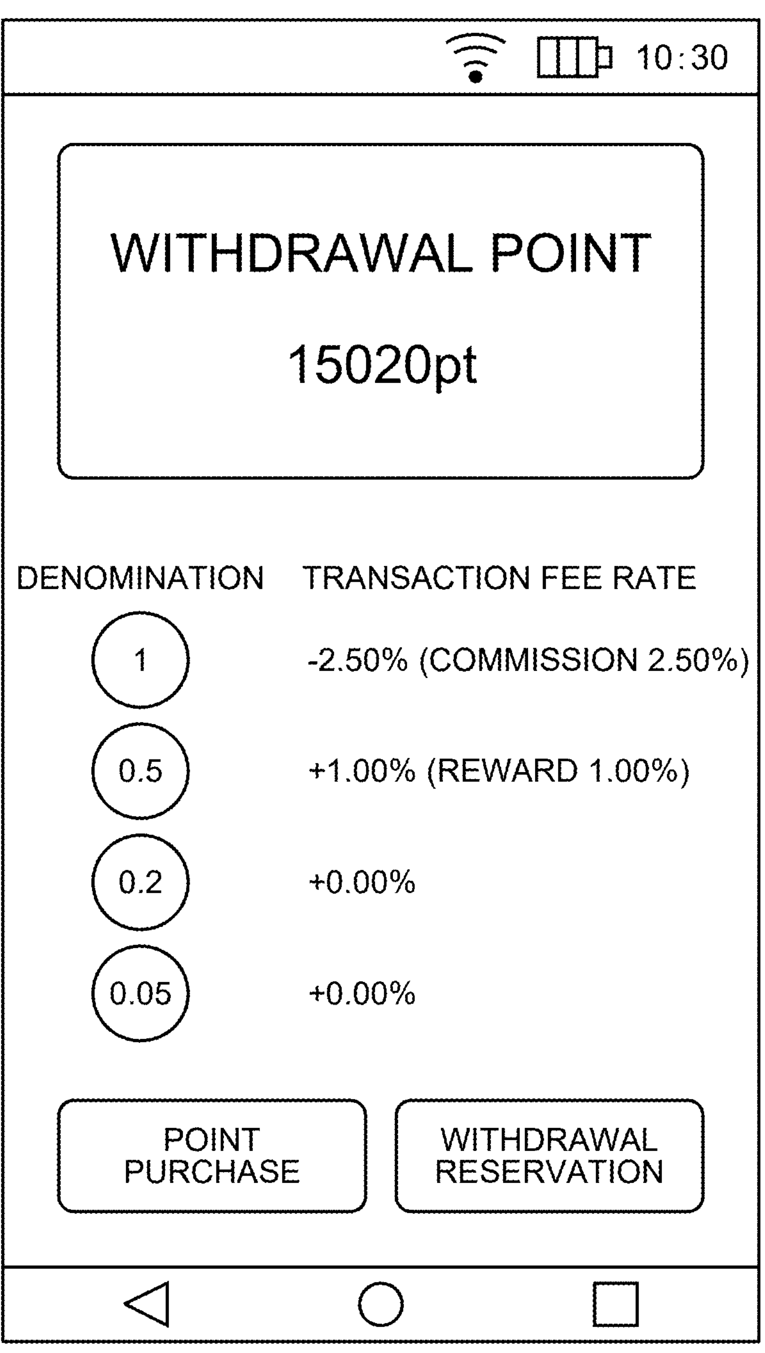
FIG. 15 shows an example of an initial screen for withdrawal reservation.

The clerk 12 can make a reservation for a withdrawal transaction of change fund while the customer can make a reservation for a deposit transaction. The clerk 12 runs a dedicated application on the operation terminal 300*b* to access the management apparatus 100, and inputs the user ID and the password. When an identification process with the user ID and the password has ended, an initial screen for a withdrawal reservation is displayed on the operation terminal 300*b*. FIG. 15 shows an example of the initial screen for the withdrawal reservation. The number of withdrawal points possessed by the store 3*b*, the current transaction conditions applied to the store 3*b*, a point purchase button, and a withdrawal reservation button are displayed on the screen. The transaction conditions include denominations of money withdrawable from the transaction apparatus 200, and the transaction fee rates for the respective denominations. The clerk 12 can purchase withdrawal points by pressing the point purchase button on this screen.

Figures 16A, 16B:
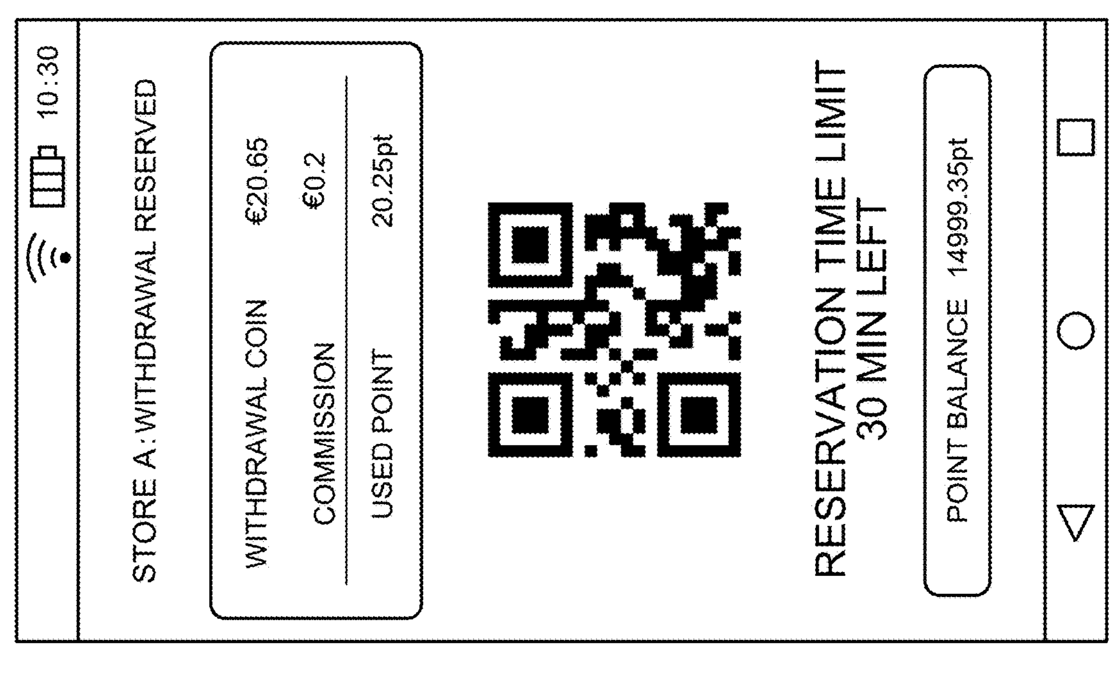
FIGS. 16A and 16B show examples of a screen displayed when a withdrawal transaction is reserved.

The clerk 12 presses the withdrawal reservation button to start reservation for the withdrawal transaction. FIGS. 16A and 16B show examples of a screen displayed when the withdrawal transaction is reserved. FIG. 16A shows an example of a withdrawal reservation screen. A list of denominations currently withdrawable from the transaction apparatus 200 is displayed on the withdrawal reservation screen. When the clerk 12 touches the number of coins for each denomination which is enclosed by a rectangle, a numeric keypad is displayed in another window and allows the clerk 12 to input the number of coins. When the clerk 12 has inputted the number of coins, a commission or a reward amount is calculated based on the transaction fee rate for this denomination and displayed on the withdrawal reservation screen. For example, if the clerk 12 inputs "10" as the number of 1-euro coins to be withdrawn, the transaction fee rate of −2.5% shown in FIG. 15 is applied, and a commission for withdrawal of ten 1-euro coins is displayed as 0.25 euro as shown in FIG. 16A. The clerk 12 can invoke withdrawal patterns of change fund in the past by pressing a history button on the withdrawal reservation screen. When the clerk 12 has invoked and applied the withdrawal pattern, the number of coins for each denomination is automatically inputted based on the withdrawal pattern.

When the clerk 12 has inputted the number of coins, the total number and the total amount of the change fund for which withdrawal reservation is to be made, the total amount of the commissions and the reward amounts for all the denominations of the change fund, and the number of withdrawal points to be used for the withdrawal, are displayed on the withdrawal reservation screen. The example shown in FIG. 16A indicates that a commission of 0.2 euro is charged on withdrawal of 63 coins as the change fund for 20.45 euros, and that 20.65 withdrawal points (=20.45 points+0.2 point as a commission) are needed for the withdrawal. The clerk 12 can press a cancel button to stop the withdrawal reservation. If the clerk 12 presses an OK button, the withdrawal reservation is made, and the screen shown in FIG. 16B is displayed. Information related to the reserved change fund, a graphic code in which the reservation content is encoded, a reservation time limit by which the clerk 12 can perform the reserved withdrawal transaction, and the balance of withdrawal points after the reserved withdrawal transaction is performed, are displayed on the screen.

The clerk 12 goes to the store 3*a* and causes the code acquisition unit 250 of the transaction apparatus 200 to read the graphic code on the screen shown in FIG. 16B before the reservation time limit expires. Thus, the clerk 12 can start the reserved withdrawal transaction. When the reservation time limit has expired, the reservation is canceled and the clerk 12 cannot perform the reserved withdrawal transaction.

The content of the transaction reserved by the operation terminal 300*b* is managed by the management apparatus 100. Specifically, the transaction management unit 114 of the management apparatus 100 registers the reservation information in the transaction information 134 in the memory 130 and manages the registered information. The clerk 11 of the store 3*a* runs a dedicated application on the operation terminal 300*a* to browse the reservation information managed by the management apparatus 100. In the reservation information, the clerk 11 can confirm the denominations and the number of coins for each denomination for which withdrawal reservation was made. The clerk 11 can change the transaction conditions based on the confirmation result.

The transaction management unit 114 of the management apparatus 100 transmits the reservation information to the transaction apparatus 200. In the transaction apparatus 200 that has received the reservation information, the inventory management unit 211 manages the content of the reservation. The inventory management unit 211 manages the inventory of money stored in the transaction apparatus 200 so that the reserved withdrawal transaction can be performed. The processing of the processing unit 213 is restricted according to management of the inventory management unit 211. Specifically, the inventory management unit 211 manages the inventory of coins so that the denomination and the number of coins, for which withdrawal reservation was made by the clerk 12, can be withdrawn from the transaction apparatus 200. That is, the denomination and the number of coins, for which withdrawal reservation was made, are secured in the transaction apparatus 200 until the reservation time limit expires. This avoids an undesirable situation that the clerk 12, who goes to the store 3*a*, cannot perform the reserved withdrawal transaction with the transaction apparatus 200.

In the above example, the clerk 12 of the store 3*b* performs the withdrawal transaction with the transaction apparatus 200 installed in the store 3*a*. However, if there is another transaction apparatus 200 available for the withdrawal transaction, the clerk 12 can select a transaction apparatus 200 that offers more advantageous transaction conditions, and perform the withdrawal transaction with the selected transaction apparatus 200. Specifically, the clerk 12 may select a transaction apparatus 200 with which he/she can withdraw a desired change fund by using as little withdrawal points as possible. If some transaction apparatuses 200 offer the same number of withdrawal points for the desired change fund, the clerk 12 may select a transaction apparatus 200 with which he/she can gain a larger amount of money as a reward for the withdrawal transaction.

As in the case of deposit transaction, the condition management unit 112 and the store management unit 113 of the management apparatus 100 can disclose information on a plurality of transaction apparatuses 200 that can perform withdrawal transactions, stores where the respective transaction apparatuses 200 are installed, and the transaction conditions for withdrawal transactions to be performed in the respective transaction apparatuses 200. The clerk 12 can browse the information on the withdrawal transaction by using the operation terminal 300*b*. Then, the clerk 12 can select a transaction apparatus 200 to be used for a withdrawal transaction, and reserve the withdrawal transaction. As in the case of deposit transaction, for example, the management apparatus 100 discloses the distances to the stores, where the respective transaction apparatuses 200 are installed, as shown in FIG. 5A, and discloses the transaction conditions for the respective transaction apparatuses 200 as shown in FIG. 5B. This allows the clerk 12 to select a transaction apparatus 200 with reference to the distances to the stores and the transaction conditions.

[Another Example of Withdrawal Transaction]

Although FIG. 13 shows the case where the store 3*a* has the right of possession to the money in the transaction apparatus 200, there is a case where the store 3*a* has no right of possession to the money in the transaction apparatus 200. Specifically, the management company that manages the transaction apparatus 200 may have the right of possession to the money in the transaction apparatus 200. A withdrawal transaction in the case where not the store 3 having the transaction apparatus 200 stored therein but the management company has the right of possession to the money in the transaction apparatus 200, will be described. Hereinafter, differences from the withdrawal transaction shown in FIG. 13 will be mainly described.

Figure 17:
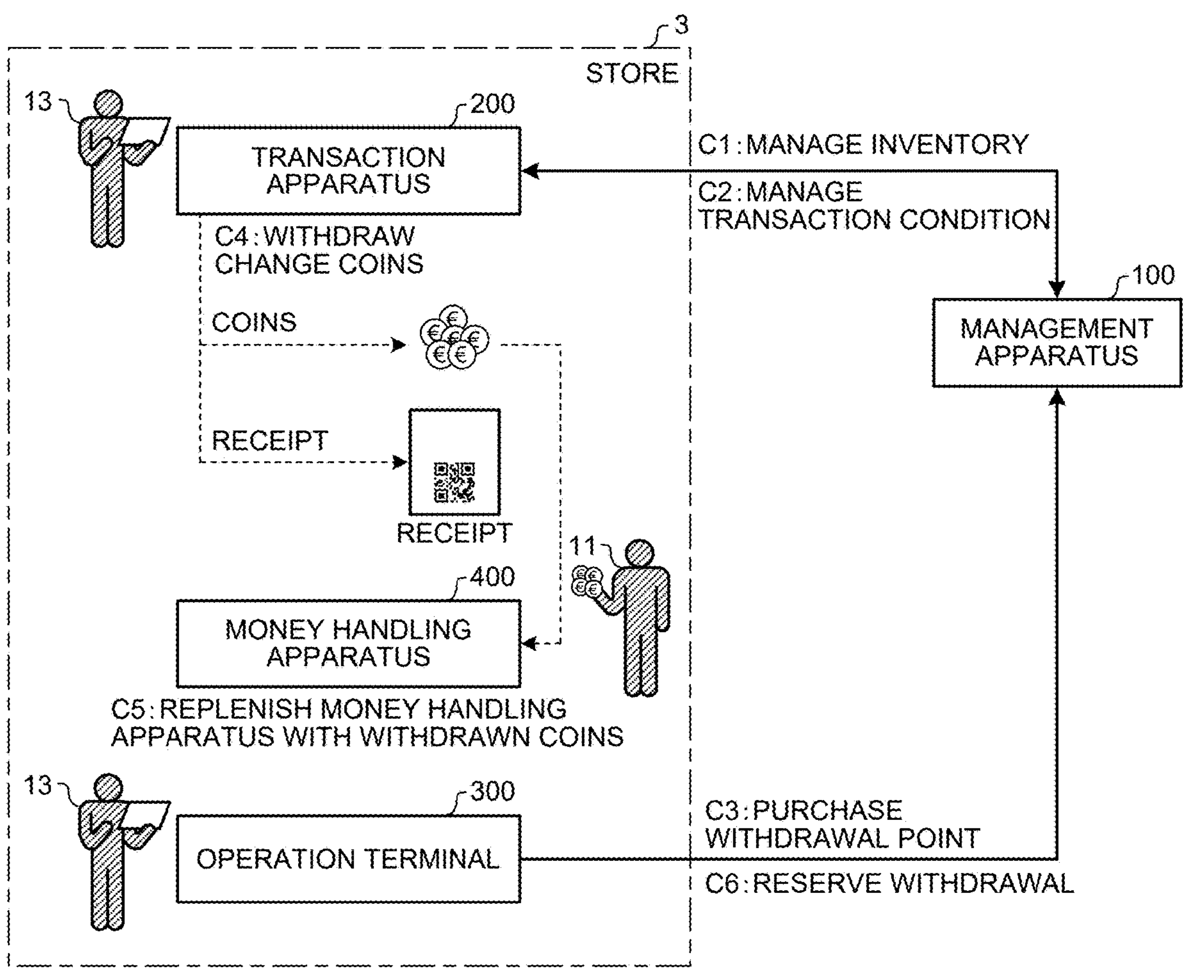
FIG. 17 is a schematic diagram illustrating a withdrawal transaction when a management company has the right of possession to money in the transaction apparatus.

FIG. 17 schematically illustrates the withdrawal transaction in the case where the management company has the right of possession to the money in the transaction apparatus 200. The management company, by using the management apparatus 100, manages the inventory of money stored in the transaction apparatus 200 in the store 3 (C1). Furthermore, the management apparatus 100 manages the transaction conditions for withdrawal transactions to be performed in the transaction apparatus 200 (C2). The management company having the right of possession to the money in the transaction apparatus 200 can change the transaction conditions, based on the inventory of money in the transaction apparatus 200 as described above. The clerk 13 of the store 3 operates the operation terminal 300 to purchase withdrawal points from the management company (C3).

For example, when it is predicted that coins of a certain denomination will become insufficient in the money handling apparatus 400 used as a change machine in the store 3, the clerk 13 of the store 3 withdraws change fund from the transaction apparatus 200 by using withdrawal points purchased in advance (C4). Based on the transaction conditions that are set for the store 3 by the management company, the transaction apparatus 200 calculates a commission or a reward amount for each of denominations of the change fund, and calculates the total amount of the commissions and the reward amounts for all the denominations. The clerk 13 confirms the calculation result, and withdraws the change fund by using the withdrawal points. When the change fund is withdrawn, a receipt on which the content of the withdrawal transaction is printed is issued. The clerk 13 receives the receipt and the change fund discharged from the transaction apparatus 200, and replenishes the money handling apparatus 400 with the change fund (C5). As in the case of the withdrawal transaction shown in FIG. 13, the clerk 13 can reserve the withdrawal transaction for the change fund by using the operation terminal 300.

[Modifications]

In the present embodiment, the customer confirms the transaction conditions and/or the distances to the stores where the transaction apparatuses 200 are installed, and thereafter makes a reservation for a deposit transaction. However, the reservation method is not limited thereto. For example, the management apparatus 100 may receive, from the customer, an input of the denominations and the quantity of money for each denomination to be deposited, and thereafter may display the transaction apparatuses 200 available for the deposit transaction on the mobile terminal 500 of the customer. In this case, the management apparatus 100 calculates a commission to be charged on the deposit transaction or a reward amount to be gained through the deposit transaction, based on the transaction conditions for each transaction apparatus 200. Then, the management apparatus 100 displays, on the mobile terminal 500, the calculation result together with the distance to the store where the corresponding transaction apparatus 200 is installed. The customer, by operating the mobile terminal 500, can change the display order of a plurality of transaction apparatuses 200 displayed on the mobile terminal 500 such that the transaction apparatuses 200 are displayed in descending order of transaction conditions advantageous to the customer. The customer can change the display order of the transaction apparatuses 200 such that the transaction apparatuses 200 are displayed in ascending order of distances from the customer to the stores where the transaction apparatuses 200 are installed. The customer can determine a reservation destination for the deposit transaction with reference to the display on the mobile terminal 500.

Likewise, as for a withdrawal transaction, the management apparatus 100 may receive, from a clerk in charge of a store, an input of the denominations and the quantity of money for each denomination to be withdrawn, and thereafter may display the transaction apparatuses 200 available for the withdrawal transaction on the operation terminal 300.

For example, the management apparatus 100 manages the transaction conditions for transaction apparatuses 200 installed in a plurality of stores. The management apparatus 100 sells withdrawal points usable in all the transaction apparatuses 200 to a clerk in charge of a store P. For example, it is assumed that a denomination of change fund that the store P needs is insufficient in the transaction apparatus 200 of a store Q and therefore the transaction conditions set on the store Q are disadvantageous to the store P, whereas the quantity of money of this denomination is sufficient in the transaction apparatus 200 of another store R and therefore the transaction conditions set on the store R are advantageous to the store P. In this case, the management apparatus 100 receives, from the clerk in charge of the store P, an input of the denomination and the quantity of money to be withdrawn, and thereafter calculates a commission to be charged on the withdrawal transaction or a reward amount to be gained through the withdrawal transaction. Then, the management apparatus 100 displays the calculation result on the operation terminal 300 together with the distances to the stores where the respective transaction apparatuses 200 are installed. The clerk in charge of the store P, by operating the operation terminal 300, can change the display order of a plurality of transaction apparatuses 200 displayed on the operation terminal 300 such that the transaction apparatuses 200 are displayed in descending order of transaction conditions advantageous to the store P or in ascending order of distances from the store P to the stores where the transaction apparatuses 200 are installed. The clerk in charge of the store P can determine a reservation destination for the withdrawal transaction with reference to the display on the operation terminal 300.

In the present embodiment, money deposited by the customer is exchanged for points usable for purchasing items in a store. However, what the deposited money is exchanged for is not particularly limited. For example, the deposited money may be exchanged for points usable in a plurality of stores that belong to the same company or different companies, or may be exchanged not for points but for electronic money.

In the present embodiment, when money change is performed, the deposit amount of money that the customer has inserted in a transaction apparatus 200 is withdrawn as money of a different denomination from the transaction apparatus 200. However, withdrawal of the money may be performed by another apparatus. For example, the transaction apparatus 200 shown in FIG. 2 receives only deposit of money, and withdrawal of money may be performed by the money handling apparatus 400. Specifically, when performing money change from coins to banknotes, the customer may deposit the coins in the transaction apparatus 200 and withdraw the banknotes from the money handling apparatus 400 installed on the checkout counter of the store.

In the present embodiment, based on the inventory of money stored in the transaction apparatus 200, the transaction system 1 can automatically adjusts the transaction fee rates for a withdrawal transaction according to whether or not the denomination of money to be withdrawn will cause a problem if the money is withdrawn. Alternatively, the transaction system 1 may automatically adjust the transaction fee rates according to the number of times of withdrawal transaction. Specifically, if the same store repeatedly performs withdrawal transaction by using a transaction apparatus 200, the transaction system 1 reduces the transaction fee rates according to the number of times of withdrawal. Thus, it is possible to collect a higher commission from the store that frequently uses the transaction apparatus 200 for withdrawal of change fund, than from a store that infrequently uses the transaction apparatus 200. For example, based on the transaction content of each store managed in the transaction information 134, the condition management unit 112 substitutes the number of times of withdrawal transaction performed by each store into a preset calculation formula, thereby setting the transaction fee rates. Alternatively, for example, the condition management unit 112 refers to a table in which the correspondence between the number of times of withdrawal transaction and the transaction fee rates is set in advance, and changes the transaction fee rates for each store based on the settings in the table.

In the present embodiment, a transaction system includes: a money handling unit configured to receive money, and recognize and count the received money to acquire a quantity of money for each denomination and a first total amount of the received money; a memory configured to store therein a transaction condition including a transaction fee rate set for each denomination in advance; and a processing unit configured to calculate, for each denomination, an amount of money by multiplying the quantity of money for each denomination by the transaction fee rate, based on the quantity of money and the transaction condition, and to perform processing related to a transaction of the received money, based on the first total amount acquired by the money handling unit and on a second total amount that is calculated by summing up the calculated amounts of money for the respective denominations.

In the above configuration, the transaction fee rate for each denomination is an incentive rate for calculating an amount of money to be given to a user, or a commission rate for calculating a commission to be collected from the user.

In the above configuration, the transaction condition is set for each of types of transactions to be performed by the processing unit, and the processing unit is configured to receive an input of selecting a type of transaction, and perform the processing based on the transaction condition set for the selected transaction.

In the above configuration, the types of transactions include at least one of money change, issuance of a coupon, and giving of information having a monetary value.

In the above configuration, the configuration further includes an operation unit used for inputting information on the transactions. When a type of transaction has been selected through an operation performed by using the operation unit, the processing unit is configured to perform the processing related to the transaction of the received money, based on the transaction condition corresponding to the type of the selected transaction.

In the above configuration, after the money received in the money handling unit has been recognized and counted, the user, through an operation by using the operation unit, selects denominations as transaction targets out of the denominations of the received money, and the processing unit is configured to perform the processing related to the transaction, based on a quantity of money for each denomination selected by the user and on a third total amount of the money of the denominations selected by the user.

In the above configuration, the configuration further includes a condition management unit configured to manage the transaction condition, and a storage unit configured to store money therein. The condition management unit is configured to change the transaction fee rate for each denomination, based on an inventory of money for each denomination stored in the storage unit.

In the above configuration, the configuration further includes a management apparatus configured to provide the transaction condition. The management apparatus is configured to acquire inventory information, for each denomination, possessed by a store, provides the transaction fee rate for each denomination based on the inventory information, and causes the memory to store the provided transaction fee rate.

In the above configuration, the management apparatus is configured to exchange information on the transaction condition with an external device.

In the above configuration, the management apparatus is configured to accept a reservation for a transaction from the external device.

In the present embodiment, a transaction apparatus includes: a money handling unit configured to receive money, and recognize and count the received money to acquire a quantity of the money for each denomination and a first total amount of the received money; and a processing unit configured to, based on a transaction condition including a transaction fee rate set for each denomination in advance, calculate, for each denomination, an amount of money by multiplying the quantity of money for each denomination by the transaction fee rate, and to perform processing related to a transaction of the money, based on the first total amount acquired by the money handling unit and on a second total amount that is calculated by summing up the amounts of money calculated for the respective denominations.

In the present embodiment, a transaction method includes: receiving money, and recognizing and counting the received money to acquire a quantity of money for each denomination and a total amount of the received money; calculating, based on a transaction condition including a transaction fee rate set for each denomination in advance and on the quantity of money for each denomination, an amount obtained by multiplying the quantity of each denomination by the transaction fee rate, and performing a processing related to a transaction of the money, based on a total amount calculated by summing up the calculated amounts of money for the respective denominations.

In the transaction system according to the present embodiment, a transaction fee rate can be set for each denomination of money. The transaction fee rate can be set so as to collect a commission from a transaction partner, or give a reward to the transaction partner. For example, the transaction fee rate is set so as to charge no commission or give a reward when a denomination of money required by the store is deposited into the transaction apparatus. Meanwhile, for example, the transaction fee rate is set so as to charge a commission when a denomination of money not required by the store is deposited into the transaction apparatus. Adjusting the transaction fee rate for each denomination makes the denominations and the quantity of money accumulated in the store appropriate.

As described above, in the transaction system 1 according to the present embodiment, transaction conditions for a transaction accompanied by deposit of money into the transaction apparatus 200 can be set for each denomination. If transaction conditions for a denomination of money that is desired to be deposited in the transaction apparatus 200 are made advantageous to the transaction partner, it is possible to enhance incentive to perform a deposit transaction for this denomination. Meanwhile, if transaction conditions for a denomination of money that is not desired to be deposited in the transaction apparatus 200 are made disadvantageous to the transaction partner, it is possible to reduce incentive to perform a deposit transaction for this denomination. Thus, the inventory of money stored in the transaction apparatus 200 can be adjusted to an appropriate quantity.

Moreover, in the transaction system 1, transaction conditions for a transaction accompanied by withdrawal of money from the transaction apparatus 200 can be set for each denomination. If transaction conditions for a denomination of money that is desired to be withdrawn from the transaction apparatus 200 are made advantageous to the transaction partner, it is possible to enhance incentive to perform a withdrawal transaction for this denomination. Meanwhile, if transaction conditions for a denomination of money that is not desired to be withdrawn from the transaction apparatus 200 are made disadvantageous to the transaction partner, it is possible to reduce incentive to perform a withdrawal transaction for this denomination. Thus, the inventory of money stored in the transaction apparatus 200 can be adjusted to an appropriate quantity.

Moreover, in the transaction system 1, withdrawal points can be purchased through a transaction on the network from a party having the right of possession to money in the transaction apparatus 200, and money can be withdrawn from the transaction apparatus 200 by using the withdrawal points. For example, if a store needs money as change fund, the store can purchase withdrawal points by using a credit card, and acquire the money from the transaction apparatus 200 by using the withdrawal points. Thus, the store can acquire by itself money that is insufficient in the store, whenever it is needed.

As described above, the transaction system, the transaction apparatus, and the transaction method according to the present disclosure are useful for adjusting the quantity of money stored in the transaction apparatus installed in a store.

The invention claimed is:

1. A transaction system, comprising:

a memory configured to store therein a transaction condition including a transaction fee rate set for each denomination in advance and for each of a plurality of transaction types;

a management apparatus configured to manage the transaction condition in the memory;

a transaction apparatus including:

a display to display and receive input information on a transaction with a customer; and a money handling device including:

an inlet to receive money from the customer, a transport path provided with a recognition circuit, the recognition circuit configured to recognize and count the received money while the money is transported along the transport path, and to acquire a quantity of money for each denomination and a first amount that is a total amount of the received money, and a plurality of storages which each store money; and processing circuitry configured to accept an operation from the customer, through the display, to select a transaction type of the plurality of transaction types;

display, on the display, information on a transaction fee rate corresponding to both a denomination and the transaction type selected by the customer;

calculate, for each denomination of the received money, a second amount by multiplying the quantity of money by the transaction fee rate corresponding to both the denomination and the transaction type;

calculate a transaction fee that is a total of the second amounts of each denomination;

perform, based on the transaction fee, a transaction of exchanging money into a different form of value corresponding to the transaction type; and control the money handling device to store the received money in the plurality of storages and to discharge exchanged value.

2. The transaction system according to claim 1, wherein the transaction of exchanging money into a different form of value includes at least one of money exchange, issuance of a coupon, and providing information having a monetary value.

3. The transaction system according to claim 1, wherein the processing circuitry is further configured to display, on the display, a screen for selecting the transaction type, after recognizing and counting the received money.

4. The transaction system according to claim 3, wherein in a case that the transaction type is changed by selecting the transaction type on the screen, the processing circuitry recalculates the transaction fee, which is a reward provided to the customer or a commission charged to the customer, based on the denominations and the quantity of money of each denomination of the received money.

5. The transaction system according to claim 1, wherein the transaction apparatus stores the money therein, and the processing circuitry is configured to change the transaction fee rate set for each denomination, based on an inventory of money for each denomination stored in the transaction apparatus.

6. The transaction system according to claim 1, wherein the processing circuitry is further configured to:

acquire inventory information for each denomination possessed by a store;

provide the transaction fee rate for each denomination based on the inventory information; and control the memory to store the provided transaction fee rate.

7. The transaction system according to claim 1, wherein the processing circuitry is further configured to:

accept another operation from the customer, through the display, to increase the quantity of the received money by depositing additional money and/or decrease the quantity of the received money by dispensing a part of the received money, for changing the second amount of at least one denomination out of the denominations of the received money;

recalculate the second amounts after the another operation; and perform the transaction based on the transaction fee that is a total of the recalculated second amounts.

8. The transaction system according to claim 1, wherein the transaction fee rate is an incentive rate for calculating an amount of money to be given to the customer, or a commission rate for calculating a commission to be collected from the customer.

9. The transaction system according to claim 1, wherein the transaction condition includes a commission rate of the transaction apparatus.

10. The transaction system according to claim 1, wherein the transaction condition includes a reward for the customer for performing a transaction with the transaction apparatus.

11. A method, comprising:

storing, in a memory, a transaction condition including a transaction fee rate set for each denomination in advance and for each of a plurality of transaction types;

displaying and receiving, via a display of a transaction apparatus, input information on a transaction with a customer;

receiving, by an inlet of the transaction apparatus, money from the customer;

recognizing and counting, by a recognition circuit of the transaction apparatus while the received money is transported along a transport path of the transaction apparatus, the received money to acquire a quantity of money for each denomination and a first amount that is a total amount of the received money;

accepting an operation from the customer, through the display, to select a transaction type of the plurality of transaction types;

displaying, on the display, information on a transaction fee rate corresponding to both a denomination and the transaction type selected by the customer;

calculating, for each denomination of the received money, a second amount by multiplying the quantity of money by the transaction fee rate corresponding to both the denomination and the transaction type;

calculating a transaction fee that is a total of the second amounts of each denomination;

performing, based on the transaction fee, a transaction of exchanging money into a different form a value corresponding to the selected transaction type;

storing the received money in the plurality of storages; and discharging exchanged value from the transaction apparatus.

12. The method according to claim 11, wherein the transaction of exchanging money into a different form of value includes at least one of money exchange, issuance of a coupon, and providing information having a monetary value.

13. The method according to claim 11, further comprising displaying, on the display, a screen for selecting the transaction type, after recognizing and counting the received money.

14. The method according to claim 13, further comprising:

in a case that the transaction type is changed by selecting the transaction type on the screen, recalculating the transaction fee, which is a reward provided to the customer or a commission charged to the customer, based on the denominations and the quantity of money of each denomination of the received money.

15. The method according to claim 11, wherein the transaction apparatus stores the money therein, and the method further comprises changing the transaction fee rate set for each denomination, based on an inventory of money for each denomination stored in the transaction apparatus.

16. The method according to claim 11, further comprising:

acquiring inventory information for each denomination possessed by a store;

providing the transaction fee rate for each denomination based on the inventory information; and controlling the memory to store the provided transaction fee rate.

17. The method according to claim 11, further comprising:

accepting another operation from the customer, through the display, to increase the quantity of the received money by depositing additional money and/or decrease the quantity of the received money by dispensing a part of the received money, for changing the second amount of at least one denomination out of the denominations of the received money;

recalculating the second amounts after the another operation; and performing the transaction based on the transaction fee that is a total of the recalculated second amounts.

18. The method according to claim 11, wherein the transaction fee rate is an incentive rate for calculating an amount of money to be given to the customer, or a commission rate for calculating a commission to be collected from the customer.

* * * * *